United States Patent
Cole et al.

(10) Patent No.: US 11,409,402 B1
(45) Date of Patent: Aug. 9, 2022

(54) VIRTUAL REALITY USER INTERFACE COMMUNICATIONS AND FEEDBACK

(71) Applicant: Amazon Technologies, Inc., Seattle, WA (US)

(72) Inventors: David Robert Cole, Brier, WA (US); Dillon Taylor Baker, Seattle, WA (US); Jason Andrew Brightman, Oakland, CA (US); Hai Quang Kim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 670 days.

(21) Appl. No.: 15/866,348

(22) Filed: Jan. 9, 2018

(51) Int. Cl.
| | |
|---|---|
| *G06F 3/04815* | (2022.01) |
| *G06T 19/00* | (2011.01) |
| *G02B 27/01* | (2006.01) |
| *G06F 3/04817* | (2022.01) |
| *G06F 3/01* | (2006.01) |

(52) U.S. Cl.
CPC ....... *G06F 3/04815* (2013.01); *G02B 27/017* (2013.01); *G06F 3/011* (2013.01); *G06F 3/04817* (2013.01); *G06T 19/003* (2013.01)

(58) Field of Classification Search
CPC ... G06F 3/04815; G06F 3/011; G02B 27/017; G06T 19/003
See application file for complete search history.

(56) References Cited

U.S. PATENT DOCUMENTS

| | | | |
|---|---|---|---|
| 2005/0086612 A1* | 4/2005 | Gettman | G06F 3/04815 715/848 |
| 2010/0185514 A1* | 7/2010 | Glazer | G06Q 30/0253 705/14.51 |
| 2015/0302334 A1* | 10/2015 | Thomas | G06F 3/0484 705/7.26 |
| 2017/0151484 A1* | 6/2017 | Reilly | A63B 71/0622 |
| 2018/0150903 A1* | 5/2018 | Waldron | G06Q 30/0639 |
| 2018/0307909 A1* | 10/2018 | O'Brien | H04L 41/22 |

\* cited by examiner

*Primary Examiner* — Roland J Casillas
(74) *Attorney, Agent, or Firm* — Athorus, PLLC

(57) ABSTRACT

Systems and methods for enabling communications and feedback with users of virtual reality user interfaces are described. The virtual reality user interface may include a background model, a plurality of cells and subcells, and an interaction area. The interaction area may be positioned at a virtual location of the user, and the interaction area may include a border around its periphery. Responsive to various user inputs or actions, or device or system states or conditions, visual characteristics of the interaction area and border may be selected and rendered to provide communications and feedback to a user. In addition, the interaction area and border may receive voice inputs provided by users. Accordingly, the interaction area and border may provide communications and feedback with users of virtual reality user interfaces.

20 Claims, 11 Drawing Sheets

VIRTUAL REALITY USER INTERFACE COMMUNICATIONS AND FEEDBACK

BACKGROUND

Virtual reality devices such as headsets with corresponding controllers are increasing in use. Generally, virtual reality devices may allow users to be completely immersed in digital environments such as video games. However, users of virtual reality devices may become disoriented or confused if aspects of the digital environments are unexpected or unusual, and such users may also become frustrated if interactions with aspects of the digital environments are cumbersome or unnatural. Accordingly, there is a need for virtual reality user interfaces that provide information in a clear and organized manner, and also facilitate simple and intuitive interactions by users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
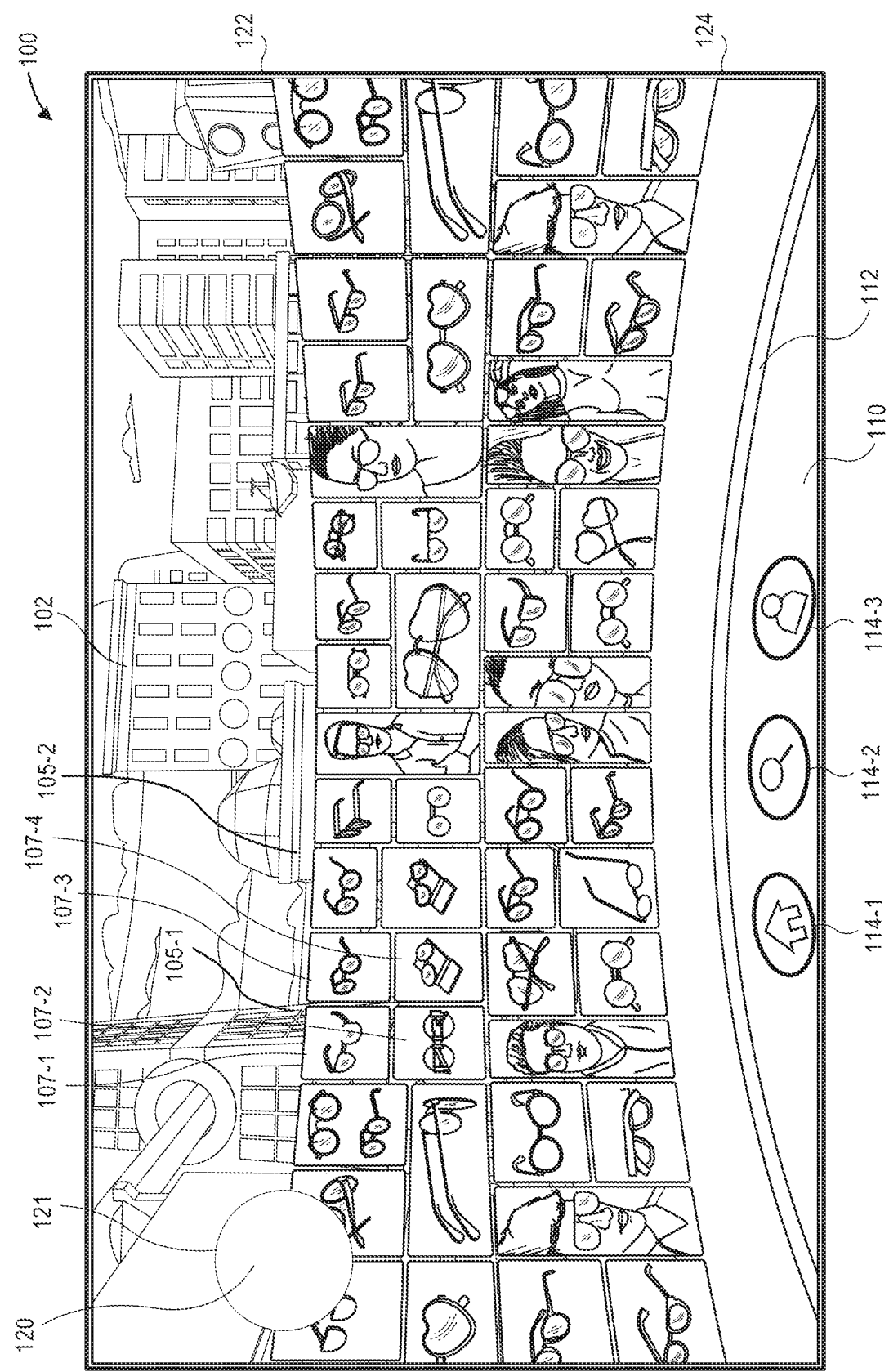
FIG. 1 is a schematic diagram of a first example view of a virtual reality user interface, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods related to generation of virtual reality user interfaces, interactions with the virtual reality user interfaces, and communications and feedback associated with the virtual reality user interfaces are described. For example, the virtual reality user interfaces described herein may include a three-dimensional model (or a two-dimensional image) of a background scene or environment, a plurality of cells and subcells including respective images, and an interaction area to facilitate communications and feedback with a user.

The three-dimensional model that simulates a background environment may include a model or geometry of an indoor environment, an outdoor environment, or any other environment or setting. In addition, the three-dimensional model may be sized to approximately correspond to a real-world environment. For example, if the three-dimensional model is an indoor environment that simulates a coffee shop, the interior space, walls, windows, doors, tables, chairs, plates, cups, and other elements of the indoor environment may be sized to approximately correspond to a real-world coffee shop from a vantage point of a user viewing the virtual reality environment. As another example, if the three-dimensional model is an outdoor environment that simulates a public park, the outdoor space, fields, paths, fences, gates, trees, plants, and other elements of the outdoor environment may be sized to approximately correspond to a real-world public park from a vantage point of a user viewing the virtual reality environment.

The plurality of cells and subcells may include a grid or other arrangements of cells and subcells that may overlay at least a portion of the three-dimensional model that simulates the background environment, and the plurality of cells and subcells may include respective images of items, objects, or products. The plurality of cells and subcells may be sized and shaped so as to indicate to a user viewing the virtual reality environment that the plurality of cells and subcells are presented closer to the user than the three-dimensional model. For example, the plurality of cells and subcells may simulate a depth or distance from a position of a user of approximately eight to twelve feet. In addition, the plurality of cells and subcells may also simulate a curvature that at least partially wraps or curves around a position of a user viewing the virtual reality environment. For example, the plurality of cells and subcells may be shaped to simulate a curvature with a position of a user being an approximate center point of the simulated curvature.

The interaction area may comprise an area associated with a position of a user viewing the virtual reality environment. For example, the interaction area may be any shape, such as a circle, ellipse, rectangle, square, or other shape, and the interaction area may be rendered at a base of the position of the user and/or centered with respect to the position of the user. In addition, the interaction area may include a border around a periphery of the interaction area, and the border may have a fixed or variable width. The interaction area may also include one or more selectable options, such as a home button, a search button, an account button, a help or tips button, or other selectable options.

Further, the interaction area and/or the border may include various visual characteristics, such as colors, illuminations, patterns, textures, or other visual characteristics. By selecting one or more combinations of visual characteristics for the interaction area and/or the border, the interaction area and/or the border may facilitate communications and/or feedback with a user that indicate or are responsive to various user actions, user inputs, system states, device conditions, or any other aspects of the devices, applications, or systems described herein. In this manner, the interaction area and/or border of the virtual reality user interfaces may represent a "brain," "conscience," or "sentience" with which a user viewing the virtual reality environment may interact and/or communicate.

When viewing the virtual reality user interfaces described herein, a user may have various options for manipulating, modifying, replacing, or otherwise interacting with the user interfaces, and various communications and feedback may be provided to the user responsive to any actions, inputs, states, or conditions of the devices, applications, or systems described herein.

For example, with the use of a virtual reality device, e.g., a headset, a user may turn his/her head left or right to change a horizontal orientation of a virtual camera within a virtual environment and view additional cells or subcells that simulate a curvature around a position of the user. In addition, a user may raise or lower his/her head to change a vertical orientation of a virtual camera within a virtual environment to view cells or details above or below the plurality of cells and subcells. Further, combinations of horizontal and vertical head movements to change both horizontal and vertical orientations of a virtual camera within a virtual environment are also possible.

With the use of a controller having one or more input elements together with a virtual reality device, e.g., a headset, a user may have further options for manipulating, modifying, replacing, or otherwise interacting with the user interfaces, and various communications and feedback may be provided to the user responsive to any actions, inputs, states, or conditions of the devices, applications, or systems described herein. For example, by swiping left or right on an input element of the controller, a user may be able to scroll left or right to view additional cells or subcells. In addition, by swiping down or up on an input element of the controller, a user may be able to zoom in or zoom out to view additional or fewer details of the cells or subcells.

Further, by single clicking a cell or subcell via an input element of the controller, a user may be able to view additional details associated with an item represented by the cell or subcell. For example, the additional details may include price, popularity, customer reviews, an option to indicate interest in an item, an option to add the item to an electronic shopping cart, an option to view details related to the item, an option to view items related to the item, or an option to purchase the item. In addition, by double clicking a cell or subcell via an input element of the controller, a user may be able to indicate interest in an item without first viewing additional details of the item, or take various other desired actions.

Moreover, by clicking, holding, moving, and releasing a cell or subcell via an input element of the controller, a user may be able to remove the cell or subcell from the plurality of cells or subcells and place the cell or subcell at a new position. For example, the removed and placed cell or subcell may appear larger, e.g., closer to the user, may expand to include additional cells or subcells, and may also include additional details. In addition, by again clicking, holding, and pulling the removed and placed cell or subcell via the input element of the controller, the user may be able to replace the plurality of cells and subcells with the selected cell or subcell. For example, the entire virtual reality user interface may be replaced with the enlarged cell or subcell having a simulated depth and simulated curvature, and the enlarged cell or subcell may include additional cells or subcells and/or additional details.

In addition to head movements and inputs received via input elements of a controller, various voice inputs may also be received by the virtual reality systems described herein to control various aspects and interactions with the systems. For example, a search for a particular item or type of item may be initiated via a voice input, and the virtual reality user interfaces described herein may be generated based at least in part on the voice input. Other interactions with the virtual reality user interfaces described herein may include voice inputs related to scrolling, panning, or zooming the interfaces, selecting a cell or subcell, indicating an interest in an item, viewing related items, adding items to an electronic shopping cart, purchasing an item, viewing additional details of an item, or any other interactions with the virtual reality user interfaces described herein.

The virtual reality user interfaces described herein may improve the ability of a computer or computing device to display information, facilitate interactions therewith, and facilitate communications and feedback with a user via a virtual reality device, a controller, voice inputs, or other inputs. The claims of this application may solve problems of prior graphical user interfaces in the context of item searching, browsing, and/or purchasing related to speed, accuracy, relevance, usability, and/or content suitability (e.g., parental controls), and may also eliminate any doubts that a user may have related to discovering, identifying, and/or purchasing an item, e.g., through the use of customer reviews, indications of interest, identifications or recommendations of related items, indications of other customers' searching, browsing, and/or purchasing behaviors, and others.

As described herein, according to example embodiments, the user interfaces may present a section detailing a three-dimensional model that simulates a background environment, a section detailing a plurality of cells and subcells that may identify items, a section detailing one or more supplemental cells that may identify collections of items, search filters, previously viewed items, or other groups of items, a section detailing selectable options related to cells or subcells, a section detailing previews of cells or subcells, a section detailing item detail pages, a section detailing an interaction area to facilitate communications and feedback, and other sections. Furthermore, various of these sections may overlay at least portions of various other sections, thereby allowing display of information clearly to a user within a limited field of view while also facilitating interactions, communication, and feedback therewith with a user. This particular arrangement and combination of sections may allow users to more efficiently and accurately make purchasing decisions when searching, browsing, and/or contemplating completing a purchase, rental, or other acquisition of an item. As such, the user interfaces described herein may improve the ability of the computer or computing device to display information, facilitate interactions therewith, and facilitate communications and feedback with a user. Further, the disclosures of related U.S. application Ser. Nos. 15/716,268 and 15/716,320, filed Sep. 26, 2017, are incorporated herein by reference in their entirety.

FIG. 1 is a schematic diagram of a first example view 100 of a virtual reality user interface, according to an implementation.

The first example view 100 includes a three-dimensional model 102 that simulates a background environment, e.g., an outdoor scene or environment. The three-dimensional model 102 may be formed of a plurality of three-dimensional mesh objects or elements, e.g., JSON files, X3D files, VRML files, or other 3-D mesh object file types, that together simulate a background scene or environment, e.g., an urban environment including buildings, streets, sidewalks, trees, vehicles, or other objects. In addition, the three-dimensional model 102 may be sized to approximately correspond to a real-world scene or environment from a vantage point of a user. In addition, the three-dimensional model 102 may simulate a default scene or environment, and/or may be selected based at least in part on user preferences, user input, user selection, search queries, currently viewed items, viewing history, purchasing history, or any other factors. For example, a search query for a particular type or category of items may be associated with one or more three-dimensional models 102 or portions thereof that include a particular scene or environment. Alternatively, a three-dimensional model 102 or a portion thereof may be selected at random, without regard to user preferences, user input, or any other factors.

Overlaid over at least a portion of the three-dimensional model 102 may be a plurality of cells 105 and subcells 107, in which the subcells 107 may result from division of one or more cells 105. For example, cell 105-1 is divided into subcells 107-1, 107-2, 107-3, 107-4. Although FIG. 1 shows a plurality of cells 105 and subcells 107 including two labeled cells 105-1, 105-2 and four labeled subcells 107-1, 107-2, 107-3, 107-4 in a grid pattern, any other number or arrangement of cells 105 and subcells 107 may also be overlaid over at least a portion of the three-dimensional model 102. In addition, although the cell 105-1 shown in FIG. 1 is divided into four subcells 107, individual cells 105 may be divided into any other number of subcells 107, e.g., two, three, four, or more subcells, or maintained as a single subcell 107 that corresponds to the entire size of a cell 105.

Each of the plurality of subcells 107 may be sized based at least in part on a respective image included in each subcell 107. For example, based at least in part on an aspect ratio of an image to be included in a subcell 107, the subcell 107 may be sized to have an approximately corresponding aspect ratio as the respective image. For example, tall or long items may be placed within subcells having corresponding aspect ratios, and square or small items may be placed within subcells having corresponding aspect ratios. Further, one or more of the images to be included in respective subcells 107 may also comprise videos or other moving images. Based at least in part on the aspect ratios of a plurality of images to be included in a plurality of subcells 107, the plurality of cells 105 may be divided into subcells 107 to accommodate at least some of the plurality of images. Because the subcells 107 are sized based at least in part on aspect ratios of images to be included therein, each cell 105 may be divided into a different number and different sizes of subcells 107 relative to a number and sizes of subcells 107 of any other cells 105.

In addition, the plurality of cells 105 and plurality of subcells 107 may have a simulated depth from a position of the user, or between a position of the user and the three-dimensional model 102 that simulates a background environment. In some embodiments, the simulated depth may be defined as an amount or number of units forward from a position of a user, which may be described in terms of Cartesian coordinates within a three-dimensional model of an environment. For example, the simulated depth may be approximately eight feet (approximately 2.4 meters) to approximately twelve feet (approximately 3.6 meters) in front of a position of the user. In addition, a perceived depth of the plurality of cells and subcells within a field of view of a user may approximately correspond to the simulated depth. Further, the plurality of cells 105 and the plurality of subcells 107 may have a simulated curvature around a position of the user. For example, the cells 105 and subcells 107 may appear to extend or wrap around a position of the user. In addition, a perceived curvature of the plurality of cells and subcells within a field of view of a user may approximately correspond to the simulated curvature.

As shown in FIG. 1, the simulated curvature may be visually created by upper edges 122 of the cells 105 and subcells 107, lower edges 124 of the cells 105 and subcells 107, and/or the shapes of the cells 105 and subcells 107. For example, in some embodiments, the upper edges 122 may form a curved or arcuate line, and the lower edges 124 may also form a curved or arcuate line. In other embodiments, the upper edges 122 and the lower edges 124 may each form the same or different curved, arcuate, or straight lines to indicate the simulated curvature. Moreover, the curved lines formed by either the upper edges 122 or the lower edges 124 may be convex or concave relative to a center of the user interface. In addition, the shapes of the cells 105 and subcells 107 may also visually indicate the simulated curvature.

Further, the curved lines formed by the upper edges 122 and/or the lower edges 124 may appear to change from the perspective of a user viewing the cells 105 and subcells 107 depending upon a particular viewpoint of the user. For example, when viewing the cells 105 and subcells 107 from a relatively higher viewpoint, the upper and lower edges 122, 124 may each form respective first curved lines, and when viewing the same cells 105 and subcells 107 from a relatively lower viewpoint, the upper and lower edges 122, 124 may each form respective second curved lines that may be different from the respective first curved lines.

An interaction area 110 may be associated with a position of the user. For example, the interaction area 110, or a periphery thereof, may have any shape, e.g., circular, elliptical, rectangular, square, other polygonal, or any other shape. In addition, the interaction area 110 may have any size, e.g., approximately corresponding to a simulated depth of the plurality of cells and subcells, smaller than the simulated depth, or larger than the simulated depth. In some embodiments, the interaction area 110 may be sized to have a maximum distance of 33 meters from a position of the user. Further, the interaction area 110 may be centered with respect to the position of the user. As shown in the example view of FIG. 1, the interaction area 110 is shaped as a circle, has a size that approximately corresponds to the simulated depth of the cells and subcells, and is centered with respect to the position of the user. Moreover, the size of the interaction area 110 is such that at least a portion of the interaction area 110 is within a field of view of the user at a nominal or default, e.g., substantially horizontal, viewing angle.

Further, the interaction area 110 may also include a border 112. For example, the border 112 may partially or completely extend around a periphery of the interaction area 110. The border 112 may have any dimensions, size, or proportions relative to the size of the interaction area 110. In some embodiments, the border 112 may be rendered as a thin line or edge that extends at least partially around the periphery of the interaction area 110. In other embodiments, the border 112 may be rendered as a relatively thicker band that extends at least partially around the periphery of the interaction area 110. Further, the size of the border 112 may be rendered differently, e.g., with different visual characteristics as described herein, responsive to various inputs, actions, states, conditions, or other aspects of the systems described herein. Moreover, the interaction area and/or the border may include a peripheral curvature, and in various embodiments, the peripheral curvature may correspond or be substantially equal to a simulated curvature of the plurality of cells and subcells, may converge with a simulated curvature of the plurality of cells and subcells, or may diverge from a simulated curvature of the plurality of cells and subcells.

The interaction area 110 and/or the border 112 may also include various visual characteristics. The visual characteristics may include various colors, illuminations, movements, animations, patterns, textures, or other visual characteristics of one or both of the interaction area 110 and border 112. Responsive to various inputs, actions, states, conditions, or other aspects of the systems described herein, one or more visual characteristics may be selected for the interaction area 110 and/or the border 112 to facilitate communications and feedback with a user. For example, the various visual characteristics may include initiation visual characteristics, default visual characteristics, voice input visual characteristics, searching/loading visual characteristics, error state visual characteristics, selection visual characteristics, volume visual characteristics, scroll/zoom limit visual characteristics, expansion visual characteristics, and/or other visual characteristics, as described herein. Each of the various visual characteristics may include various combinations of one or more colors, illuminations, patterns, textures, or other visual characteristics that may facilitate communications and feedback with a user. Although each of the various visual characteristics are described herein with respect to FIGS. 1-7 as including particular combinations of colors, illuminations, patterns, textures, movement, or other visual characteristics, any other combinations of colors, illuminations, patterns, textures, movement, or other visual characteristics may also be used to facilitate communications and feedback with a user.

In some embodiments, changes to visual characteristics of the interaction area 110 and/or the border 112 may extend from an outer periphery or edge of the interaction area 110 and/or an outer periphery or edge of the border 112 inward toward the center of the interaction area 110 and/or the border 112 for a defined distance, e.g., a few centimeters, a meter, or any other distance. In other embodiments, changes to visual characteristics of the interaction area 110 and/or the border 112 may extend from a center of the interaction area 110 and/or an inner periphery or edge of the border 112 outward toward the outer periphery of the interaction area 110 and/or the outer periphery of the border 112 for a defined distance, e.g., a few centimeters, a meter, or any other distance.

The various colors of the visual characteristics may be determined in various ways. For example, the various colors may be defined by RGB (red, green, blue) color models, CMYK (cyan, magenta, yellow, key (black)) color models, and/or other color models. The various colors may be associated with particular wavelengths or frequencies of light. For example, the color red may have wavelengths between approximately 700 nm and approximately 635 nm, the color orange may have wavelengths between approximately 635 nm and approximately 590 nm, the color yellow may have wavelengths between approximately 590 nm and approximately 560 nm, the color green may have wavelengths between approximately 560 nm and approximately 520 nm, the color cyan may have wavelengths between approximately 520 nm and approximately 490 nm, the color blue may have wavelengths between approximately 490 nm and approximately 450 nm, and the color violet may have wavelengths between approximately 450 nm and approximately 400 nm.

The various illuminations, movements, or animations of the visual characteristics may include rays, glows, halos, bubbles, sparks, flying or floating specks or particles, smoke, fog, or other visual effects that may appear to be emitted from the interaction area 110 and/or border 112. For example, in some embodiments, a cone-shaped illumination or glow may appear to be emitted upward and/or outward from the interaction area 110 and/or border 112. The various patterns or textures of the visual characteristics may include dots, dashing, cross-hatching, shapes, other repeating elements or objects, or any other patterns or textures within the interaction area 110 and/or border 112.

Further, the interaction area 110 and/or the border 112 may also include one or more selectable options 114. For example, as shown in FIG. 1, the interaction area 110 and/or the border 112 may include a selectable home option or button 114-1, a selectable search option or button 114-2, and a selectable account option or button 114-3. Other selectable options may include help options, user tips or tricks options, or any other selectable options or buttons. Further, in addition to options or buttons, the interaction area 110 may also include text, images, indicia, or any other content with which a user may communicate or receive feedback or instructions related to the systems described herein.

Generally, a user viewing the virtual reality environment may be located at a fixed position, and the interaction area 110 may be centered with respect to the fixed position of the user. In other embodiments, however, the user may be enabled to move only within the interaction area 110, and the interaction area 110 may be initially centered with respect to an initial position of the user. If a user attempts to move beyond or outside of the interaction area 110, one or more visual effects may be rendered, e.g., an illuminated grid, wireframe wall, railing, or other rendered structures or visual effects, indicating a boundary of the interaction area 110, and/or one or more audio effects may be output, e.g., a ping, a tone, a chord, a message, or other notification, that a boundary of the interaction area 110 has been reached.

In addition, as shown in FIG. 1, an overhead, or bird's eye, view 120, 121 of the interaction area 110 and border 112, respectively, may be shown in a portion of the virtual reality user interface. For example, the overhead view 120, 121 may be placed in any region or corner of the virtual reality user interface. In addition, the overhead view 120, 121 may be temporarily rendered responsive to particular inputs, actions, states, conditions, or other aspects of the systems described herein, and/or responsive to changes to the interaction area 110 and/or border 112. Alternatively, in some embodiments, the overhead view 120, 121 may not be rendered in any portion of the virtual reality user interface, and/or may be rendered according to user preferences related to the overhead view 120, 121.

As shown in FIG. 1, the interaction area 110 and the border 112, as well as the corresponding overhead view 120, 121, may include initiation visual characteristics that transition to default visual characteristics. Upon initiation of the virtual reality environment, the interaction area 110 may be substantially white and the border 112 may be substantially green, and as the virtual reality environment is loaded for use by the user, the interaction area 110 may change to be substantially green, and the border 112 may change to be substantially blue. For example, the interaction area 110 may appear to change to substantially green starting from the green border 112 and filling in toward the center of the interaction area 110. Then, the interaction area 110 and border 112 may include the default visual characteristics including a substantially green interaction area 110 and a substantially blue border 112.

Further, the default visual characteristics may also include various movements or animations such as a pulsing visual pattern that repeats between the interaction area 110 and the border 112, such that an outer portion of the interaction area 110 may appear to change to substantially blue starting from the blue border 112 and filling in toward the center of the interaction area 110, and then the outer portion of the interaction area 110 may appear to change back to substantially green starting from the center of the interaction area 110 and extending toward the blue border 112. The visual characteristics and/or changes to visual characteristics of the interaction area 110 and the border 112 may be substantially emulated or copied in the corresponding overhead view 120, 121.

In some embodiments, the interaction area 110 and border 112 may be rendered such that they move at least partially within the field of view of the user. For example, as part of the initiation visual characteristics and/or the default visual characteristics, the interaction area 110 and border 112 may appear to arrive from a location different from the position of the user, and the interaction area 110 and border 112 may move to a position that is centered with respect to the position of the user. In some example embodiments, the centering of the interaction area 110 and border 112 with respect to the position of the user may substantially coincide with completion of the transition between the initiation visual characteristics to the default visual characteristics.

In other embodiments, responsive to user inputs or actions that result in a change in a position of the user, e.g., a search query for a particular item or a selection of a cell or subcell, the interaction area 110 and border 112 may appear to move away from the position of the user to a new location. In addition, the field of view of the user may change or fade to black (or any other color), such that the user may appear to be transported, teleported, or otherwise moved to the new location associated with the search query for the particular item. Then, the field of view of the user may fade back in with a background environment and a plurality of cells and subcells at the new location associated with the search query for the particular item. Further, the interaction area 110 and border 112 may appear to arrive from the prior location of the user to the new location of the user, and the interaction area 110 and border 112 may move to a position that is centered with respect to the new position of the user. In some example embodiments, the centering of the interaction area 110 and border 112 with respect to the new position of the user may substantially coincide with completion of the movement of the user from the prior location to the new location and/or completion of the fading back in of the environment around the new position of the user. In this manner, a user may maintain an understanding of his/her movement within the virtual reality environment and avoid any disorientation or confusion due to unknown, unexplained, or sudden changes within the field of view of the user of the virtual reality environment.

In further embodiments, the movement of a user from a first location to a second location may be accompanied by additional visual changes or effects, and/or audio sounds or effects. For example, an illumination or glow of the interaction area 110 and/or border 112 may change, e.g., increase at the first location and decrease at the second location, or conversely, decrease at the first location and increase at the second location. In addition, the audio sounds or effects may include a ping, a tone, a chord, a message, or other notification, or any series or combinations thereof, e.g., with increasing volume, decreasing volume, or other changes in volume.

In still other embodiments, the plurality of cells and subcells may appear to rise out of or descend into the interaction area 110 and/or the border 112. This rising or descending of the plurality of cells and subcells may be responsive to user inputs, such as search requests, voice inputs, selections of cells or subcells, or other inputs or actions.

In further embodiments, instead of or in addition to a border 112 that extends completely around a periphery of the interaction area 110, the border 112 may be comprised of one or more portions of the border 112, each of which extends partially around the periphery of the interaction area 110. For example, each of the one or more portions may include visual characteristics that are selected based at least in part on user inputs or actions, or system or device states or conditions. In one example embodiment, responsive to a user input related to a portion of the current field of view, only one or more portions of the border 112 proximate to or associated with the user input within the portion of the current field of view may exhibit modified visual characteristics, e.g., changes in color, illumination, pattern, texture, or other characteristics. In another example embodiment, the device, application, or system may direct the attention of a user to a particular portion, e.g., related to item recommendations, information, messages, notifications, device or system information, or other items, features, or information, of the virtual reality user interface by modifying visual characteristics associated with only one or more portions of the border 112 proximate to the particular portion of the virtual reality user interface.

Further, one or more aspects of the modified visual characteristics may remain displayed, e.g., permanently, for the duration of a current session, for a limited time such as a few minutes or seconds, or other duration of time, within the one or more portions of the border 112. Alternatively or in addition, other visual markers, e.g., identifiers, symbols, characters, text, or other indicators, may replace the modified visual characteristics and remain displayed for some duration of time, as described herein, within the one or more portions of the border 112. In this manner, the interaction area 110 and/or the border 112, e.g., a border comprised of a plurality of portions around the periphery of the interaction area 110, may also maintain information related to a sequence or history of user inputs or actions, or system or device states or conditions, for some duration of time. Further, the modified visual characteristics and/or other visual markers stored within the one or more portions of the border 112 may also permit a user to return to previous views or states of the virtual reality user interface responsive to selection of such markers or portions of the border 112.

Figure 2:
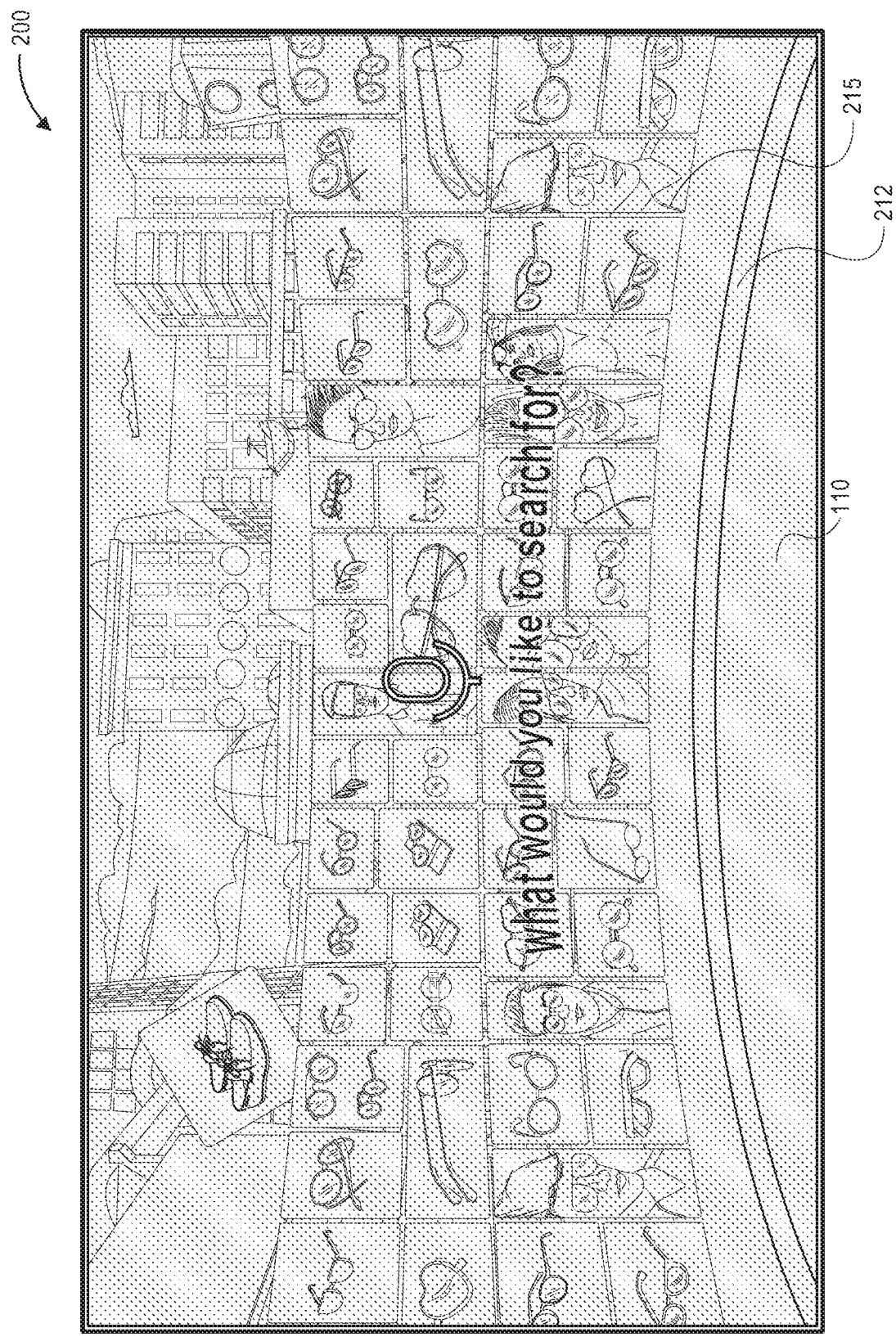
FIG. 2 is a schematic diagram of a second example view of a virtual reality user interface, according to an implementation.

FIG. 2 is a schematic diagram of a second example view 200 of a virtual reality user interface, according to an implementation.

As shown in FIG. 2, a user may have performed an action or provided an input indicating a voice input. For example, the user may have selected the search option 114-2 shown in FIG. 1, provided an input via a controller in communication with a virtual reality device, moved the controller to an orientation associated with voice input, e.g., lifted the controller toward the user's mouth, uttered a wake-up word to initiate voice input, or selected any other option or provided any other input, e.g., via one or more inputs received via the virtual reality device, a controller, or a voice input, to indicate a voice input.

Responsive to the action or input from the user indicating a voice input, voice input visual characteristics may be selected for the interaction area 110 and border 212. For example, the interaction area 110 may be substantially green and the border 212 may be substantially cyan. In addition, the substantially cyan border 212 may appear to extend at least partially vertically to create a vertical wall 215 at a simulated depth between the simulated depth of the plurality of cells and subcells and a position of the user, such that the plurality of cells and subcells are at least partially obscured or masked by the vertical wall 215. Further, the vertical wall 215 may appear to have a simulated curvature similar to the simulated curvature of the plurality of cells and subcells. In some embodiments, the vertical wall 215 may be at least partially translucent, such that the plurality of cells and subcells that the user was previously viewing remain at least partially visible.

Further, the border 212, the vertical wall 215, and/or the interaction area 110 may also include one or more indicia, signs, symbols, text, or other communications or feedback to the user. For example, the indicia or text may include prompts or symbols indicating that the system is awaiting voice input, prompts or symbols indicating receipt of voice input, prompts or symbols indicating processing of voice input, or any other indicia or text related to voice input. Further, one or more audio sounds or prompts, e.g., a ping, a tone, a chord, a message, or other notification, may also be provided together with the visual prompts or symbols. In some embodiments in which the voice input is a search for a particular item, after receiving and processing the voice input related to the particular item, the virtual reality user interface may return to a view similar to that of FIG. 1 that includes a plurality of cells and subcells including respective images related to the particular item, and the interaction area 110 and border 212 may revert to include default visual characteristics including a substantially green interaction area 110 and a substantially blue border 112.

Figure 3:
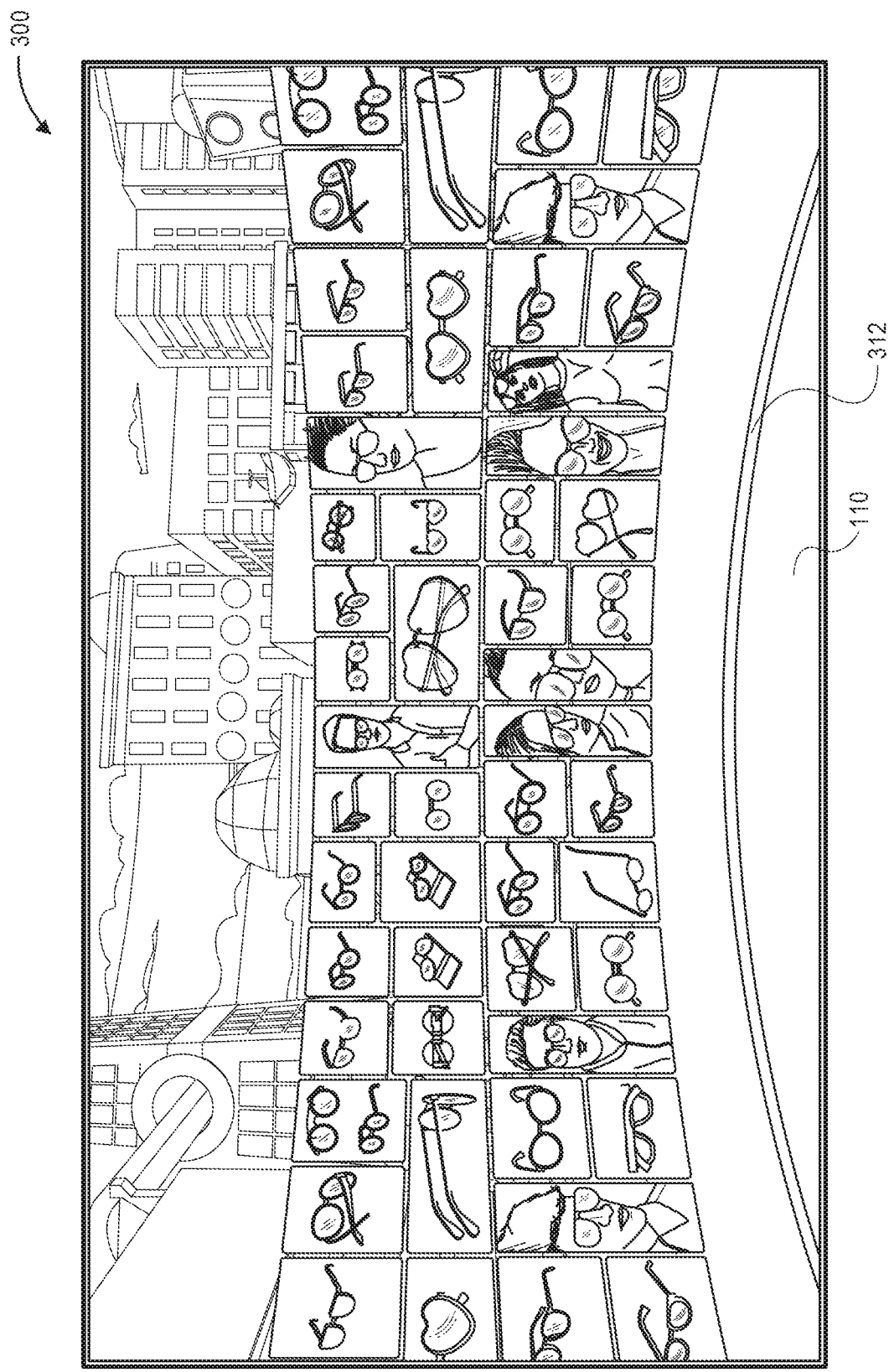
FIG. 3 is a schematic diagram of a third example view of a virtual reality user interface, according to an implementation.

FIG. 3 is a schematic diagram of a third example view 300 of a virtual reality user interface, according to an implementation.

As shown in FIG. 3, a user may have performed an action or provided an input that results in searching, loading, and/or other processing by the device, application, or system. For example, the user may have provided a search request or other user input, provided voice input, selected a selectable option, selected a cell or subcell, or selected any other option or provided any other input, e.g., via one or more inputs received via the virtual reality device, a controller, or a voice input, that results in searching, loading, and/or other processing. Some example inputs may be single-click, double-click, swipe, click-hold-move-release, or click-hold-pull inputs of an input element of a controller in communication with the virtual reality device.

Responsive to the action or input from the user that results in searching, loading, and/or other processing, searching/loading visual characteristics may be selected for the interaction area 110 and border 312. For example, the interaction area 110 may be substantially green and the border 312 may be substantially blue as compared to the default visual characteristics. In addition, the substantially blue border 312 may be slightly enlarged and/or may include a texture such that it appears fuzzy or partially translucent. Further, the substantially green interaction area 110 and the substantially blue border 312 may include various movements or animations such as a pulsing visual pattern that repeats between the interaction area 110 and the border 312, such that an outer portion of the interaction area 110 may appear to change to substantially blue starting from the blue border 312 and filling in toward the center of the interaction area 110, and then the outer portion of the interaction area 110 may appear to change back to substantially green starting from the center of the interaction area 110 and extending toward the blue border 312.

Further, the border 312 and/or the interaction area 110 may also include one or more indicia, signs, symbols, text, or other communications or feedback to the user. For example, the indicia or text may include prompts or symbols indicating that the system is searching based on the user inputs or actions, prompts or symbols indicating that the system is loading based on the user inputs or actions, prompts or symbols indicating that the system is performing other processing based on the user inputs or actions, or any other indicia or text related to the user inputs or actions. Further, one or more audio sounds or prompts, e.g., a ping, a tone, a chord, a message, or other notification, may also be provided together with the visual prompts or symbols. In some embodiments in which the user input is a search for a particular item, after processing the user input related to the particular item, the virtual reality user interface may return to a view similar to that of FIG. 1 that includes a plurality of cells and subcells including respective images related to the particular item, and the interaction area 110 and border 312 may revert to include default visual characteristics including a substantially green interaction area 110 and a substantially blue border 112.

In other embodiments, as shown in FIG. 3, a user may have performed an action or provided an input, or a state or condition of the device, application, or system may be detected, that results in an error state of the device, application, or system. For example, the user may have provided an invalid search request or other user input, provided indecipherable voice input, or selected any other option or provided any other input, e.g., via one or more inputs received via the virtual reality device, a controller, or a voice input, that results in an error state. In addition, the system or device may determine that it is in an error state or experiencing an error condition, e.g., a state that requires a restart or reloading of an application executing the virtual reality environment, a state that lacks network or internet connectivity, a low power condition, a battery overheating condition, a low memory state, or any other state or condition that results in an error state.

Responsive to the user action or input, or system or device state or condition, that results in an error state, error state visual characteristics may be selected for the interaction area 110 and border 312. For example, the interaction area 110 may be substantially green and the border 312 may be substantially red as compared to the default visual characteristics. In addition, the substantially red border 312 may be slightly enlarged and/or may include a texture such that it appears fuzzy or partially translucent. Further, the substantially green interaction area 110 and the substantially red border 312 may include various movements or animations such as a pulsing visual pattern that repeats between the interaction area 110 and the border 312, such that an outer portion of the interaction area 110 may appear to change to substantially red starting from the red border 312 and filling in toward the center of the interaction area 110, and then the outer portion of the interaction area 110 may appear to change back to substantially green starting from the center of the interaction area 110 and extending toward the red border 312.

Further, the border 312 and/or the interaction area 110 may also include one or more indicia, signs, symbols, text, or other communications or feedback to the user. For example, the indicia or text may include prompts or symbols indicating an invalid search request or input, prompts or symbols indicating an indecipherable voice input, prompts or symbols indicating system or device states or conditions, or any other indicia or text related to the user inputs or actions, or system or device states or conditions, that result in an error state. Further, one or more audio sounds or prompts, e.g., a ping, a tone, a chord, a message, or other notification, may also be provided together with the visual prompts or symbols. In some embodiments in which the user input is an invalid user input, after attempting to process the invalid user input, the virtual reality user interface may return to a view similar to that of FIG. 1 that includes a plurality of cells and subcells including respective images, e.g., viewed just prior to the invalid user input, and the interaction area 110 and border 312 may revert to include default visual characteristics including a substantially green interaction area 110 and a substantially blue border 112.

In still further embodiments, as shown in FIG. 3, a user may have performed an action or provided an input that results in confirmation of the action or input. For example, the user may have completed a purchase, lease, rental, or download of an item, or performed other related actions or provided other related inputs, e.g., via one or more inputs received via the virtual reality device, a controller, or a voice input, that results in confirmation of the action or input.

Responsive to the user action or input that results in confirmation of the action or input, confirmation visual characteristics may be selected for the interaction area 110 and border 312. For example, the interaction area 110 may be substantially green and the border 312 may be substantially yellow as compared to the default visual characteristics. In addition, the substantially yellow border 312 may be slightly enlarged and/or may include a texture such that it appears fuzzy or partially translucent. Further, the substantially green interaction area 110 and the substantially yellow border 312 may include various movements or animations such as a pulsing visual pattern that repeats between the interaction area 110 and the border 312, such that an outer portion of the interaction area 110 may appear to change to substantially yellow starting from the yellow border 312 and filling in toward the center of the interaction area 110, and then the outer portion of the interaction area 110 may appear to change back to substantially green starting from the center of the interaction area 110 and extending toward the yellow border 312.

Further, the border 312 and/or the interaction area 110 may also include one or more indicia, signs, symbols, text, or other communications or feedback to the user. For example, the indicia or text may include prompts or symbols indicating a confirmation of an action or input, or any other indicia or text related to the user inputs or actions that result in confirmation of the action or input. Further, one or more audio sounds or prompts, e.g., a ping, a tone, a chord, a message, or other notification, may also be provided together with the visual prompts or symbols. In some embodiments in which the user input is a purchase of an item, after confirming the purchase as a result of user input, the virtual reality user interface may return to a view similar to that of FIG. 1 that includes a plurality of cells and subcells including respective images, e.g., viewed just prior to the purchase of an item, and the interaction area 110 and border 312 may revert to include default visual characteristics including a substantially green interaction area 110 and a substantially blue border 112.

Figure 4:
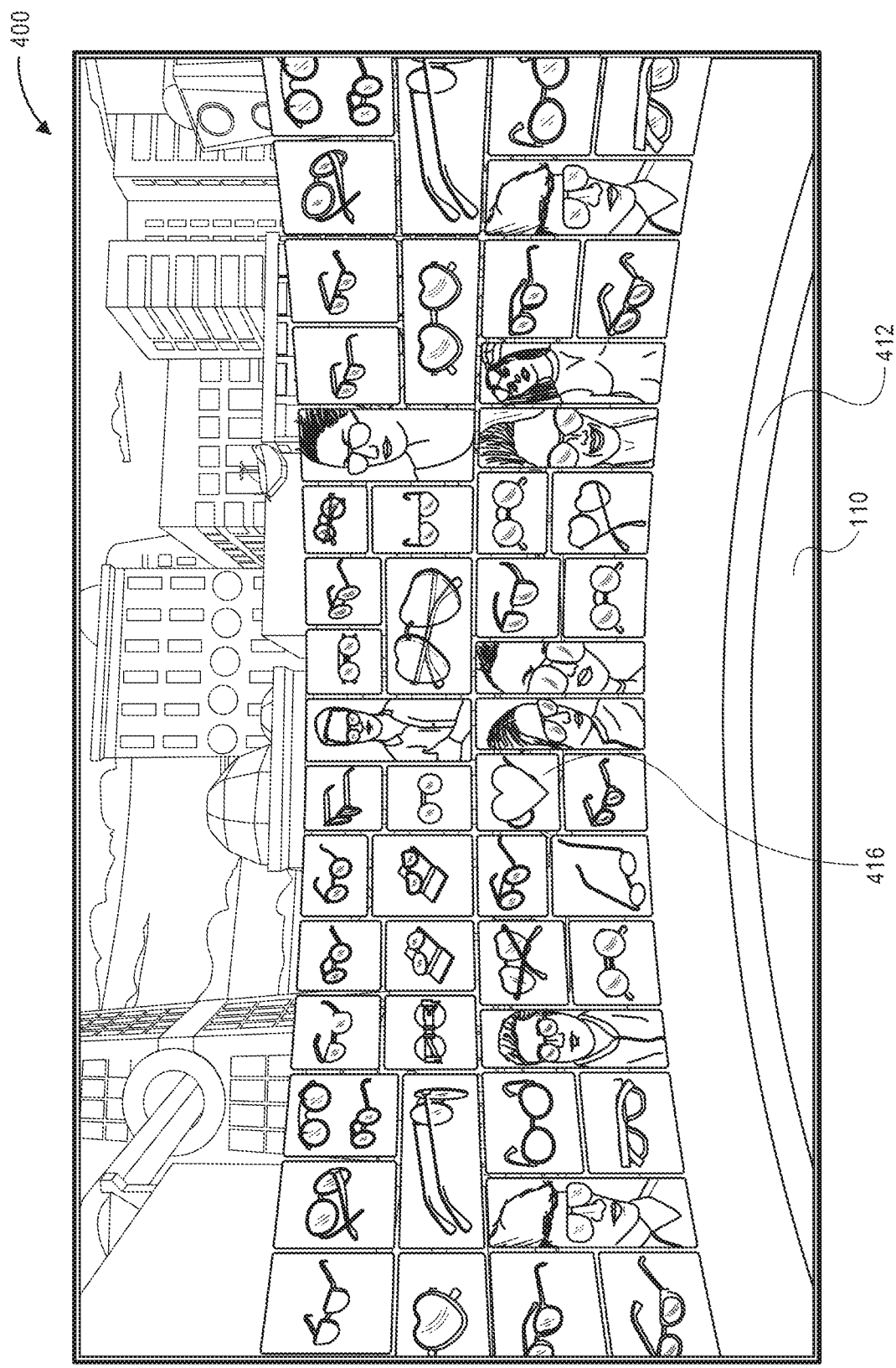
FIG. 4 is a schematic diagram of a fourth example view of a virtual reality user interface, according to an implementation.

FIG. 4 is a schematic diagram of a fourth example view 400 of a virtual reality user interface, according to an implementation.

As shown in FIG. 4, a user may have performed an action or provided an input that indicates a selection of a cell or subcell, or other selectable option, e.g., associated with a cell or sub cell. For example, the user may have selected a cell or subcell to view more details, selected an option associated with a cell or subcell, e.g., an option to indicate interest in an item, an option to add the item to an electronic shopping cart, an option to view details related to the item, an option to view items related to the item, or an option to purchase the item, or selected any other option or provided any other input, e.g., via one or more inputs received via the virtual reality device, a controller, or a voice input, that results in an indication of selection of a cell, subcell, or other selectable option. Some example inputs may be single-click, double-click, swipe, click-hold-move-release, or click-hold-pull inputs of an input element of a controller in communication with the virtual reality device.

Responsive to the action or input from the user that results in an indication of selection of a cell, subcell, or other selectable option, selection visual characteristics may be selected for the interaction area 110 and border 412. For example, the interaction area 110 may be substantially green and the border 412 may be substantially orange as compared to the default visual characteristics. In addition, the substantially orange border 412 may be slightly enlarged and/or may include a texture such that it appears fuzzy or partially translucent. Further, the substantially green interaction area 110 and the substantially orange border 412 may include various movements or animations such as a pulsing visual pattern that repeats between the interaction area 110 and the border 412, such that an outer portion of the interaction area 110 may appear to change to substantially orange starting from the orange border 412 and filling in toward the center of the interaction area 110, and then the outer portion of the interaction area 110 may appear to change back to substantially green starting from the center of the interaction area 110 and extending toward the orange border 412.

Further, the border 412 and/or the interaction area 110 may also include one or more indicia, signs, symbols, text, or other communications or feedback to the user. For example, the indicia or text may include prompts or symbols indicating that the system acknowledges selection of a cell or subcell, prompts or symbols indicating that the system acknowledges selection of a selectable option associated with a cell or subcell, prompts or symbols indicating that the system acknowledges selection of any other selectable option, or any other indicia or text related to the user inputs or actions. Further, one or more audio sounds or prompts, e.g., a ping, a tone, a chord, a message, or other notification, may also be provided together with the visual prompts or symbols. In some embodiments in which the user input is a selection of a subcell including a particular item, after acknowledging selection of the subcell including the particular item, the virtual reality user interface may return to a view similar to that of FIG. 1 that includes a plurality of cells and subcells including respective images related to the particular item, and the interaction area 110 and border 412 may revert to include default visual characteristics including a substantially green interaction area 110 and a substantially blue border 112.

Moreover, in some embodiments, one or more cells, subcells, or other selectable options may also include visual effects or changes that correspond to the selected visual characteristics for the interaction area 110 and/or the border 412. For example, as shown in FIG. 4, upon selection of an option to indicate interest in an item shown in a subcell, an orange heart 416 may further be temporarily rendered within the selected subcell as further confirmation of the user input. Likewise, selection of a cell, subcell, or other selectable option may result in a corresponding visual effect or change associated with the cell, subcell, or other selectable option, e.g., temporarily changing a color of the border of the cell, subcell, or other selectable option to match the change in color of the border 412, temporarily filling the cell, subcell, or other selectable option with a color to match the change in color of the border 412, or other visual effects or changes.

Figure 5:
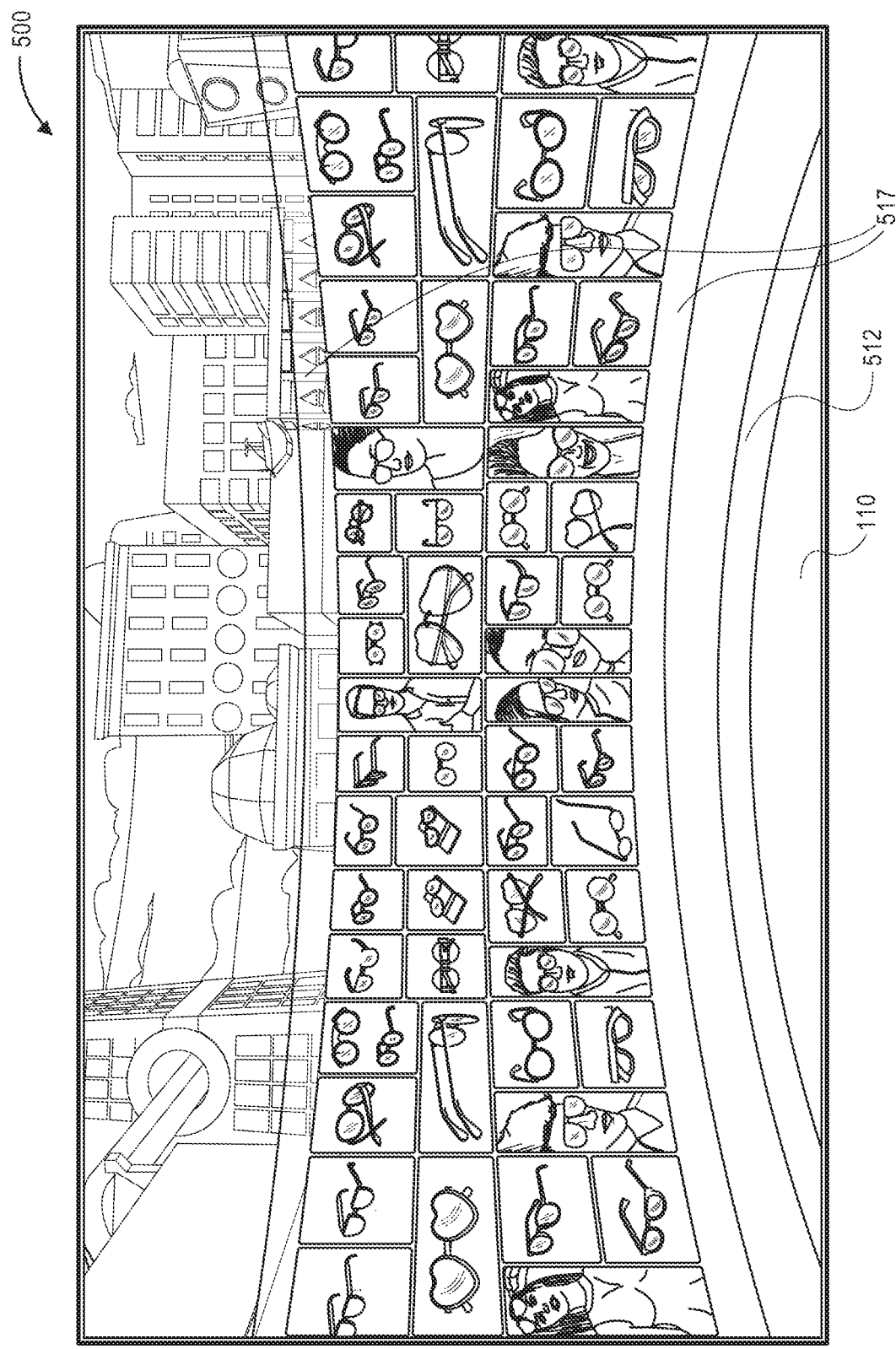
FIG. 5 is a schematic diagram of a fifth example view of a virtual reality user interface, according to an implementation.

FIG. 5 is a schematic diagram of a fifth example view 500 of a virtual reality user interface, according to an implementation.

As shown in FIG. 5, a user may have performed an action or provided an input that scrolls, moves, or zooms a cell, subcell, or a plurality of cells or subcells beyond an allowable range. For example, the user may have attempted to zoom out the plurality of cells and subcells beyond an allowable range away from a position of the user, e.g., via one or more inputs received via the virtual reality device, a controller, or a voice input, that results in an indication of a scroll/zoom limit. One example input to alter a level of zoom may be a vertical swipe motion or gesture received via an input element of a controller in communication with the virtual reality device. Other example inputs may be single-click, double-click, swipe, click-hold-move-release, or click-hold-pull inputs of an input element of a controller in communication with the virtual reality device.

Responsive to the action or input from the user that results in scrolling, moving, or zooming a cell, subcell, or a plurality of cells or subcells beyond an allowable range, scroll/zoom limit visual characteristics may be selected for the interaction area 110 and border 512. For example, the interaction area 110 may be substantially green and the border 512 may be substantially purple as compared to the default visual characteristics. In addition, the substantially purple border 512 may be slightly enlarged and/or may include a texture such that it appears fuzzy or partially translucent. Further, the substantially green interaction area 110 and the substantially purple border 512 may include various movements or animations such as a pulsing visual pattern that repeats between the interaction area 110 and the border 512, such that an outer portion of the interaction area 110 may appear to change to substantially purple starting from the purple border 512 and filling in toward the center of the interaction area 110, and then the outer portion of the interaction area 110 may appear to change back to substantially green starting from the center of the interaction area 110 and extending toward the purple border 512.

Further, the border 512 and/or the interaction area 110 may also include one or more indicia, signs, symbols, text, or other communications or feedback to the user. For example, the indicia or text may include prompts or symbols indicating that the cell, subcell, or a plurality of cells and subcells has reached a scrolling, movement, or zooming limit, or any other indicia or text related to the user inputs or actions. Further, one or more audio sounds or prompts, e.g., a ping, a tone, a chord, a message, or other notification, may also be provided together with the visual prompts or symbols. In some embodiments in which the user input is a movement of a plurality of cells and subcells beyond an allowable range, after indicating a movement limit of the plurality of cells and subcells, the virtual reality user interface may return to a view similar to that of FIG. 1 that includes a plurality of cells and subcells including respective images, and the interaction area 110 and border 512 may revert to include default visual characteristics including a substantially green interaction area 110 and a substantially blue border 112.

Moreover, in some embodiments, one or more cells, subcells, or pluralities of cells or subcells may also include visual effects or changes that correspond to the selected visual characteristics for the interaction area 110 and/or the border 512. For example, as shown in FIG. 5, upon scrolling, moving, or zooming a cell, subcell, or a plurality of cells or subcells beyond an allowable range, one or more purple bands or regions 517 may further be temporarily rendered around the moved cell, subcell, or plurality of cells or subcells as further indication of the movement limit. For example, a lower purple band 517 may be temporarily rendered below the plurality of cells and subcells, and/or an upper purple band 517 may be temporarily rendered above the plurality of cells and subcells. Likewise, scrolling, moving, or zooming a cell, subcell, or a plurality of cells or subcells beyond an allowable range may result in a corresponding visual effect or change associated with the cell, subcell, or plurality of cells or subcells, e.g., temporarily changing a color of the border of the cell, subcell, or plurality of cells or subcells to match the change in color of the border 512, temporarily filling the cell, subcell, or plurality of cells or subcells with a color to match the change in color of the border 512, or other visual effects or changes.

Figure 6:
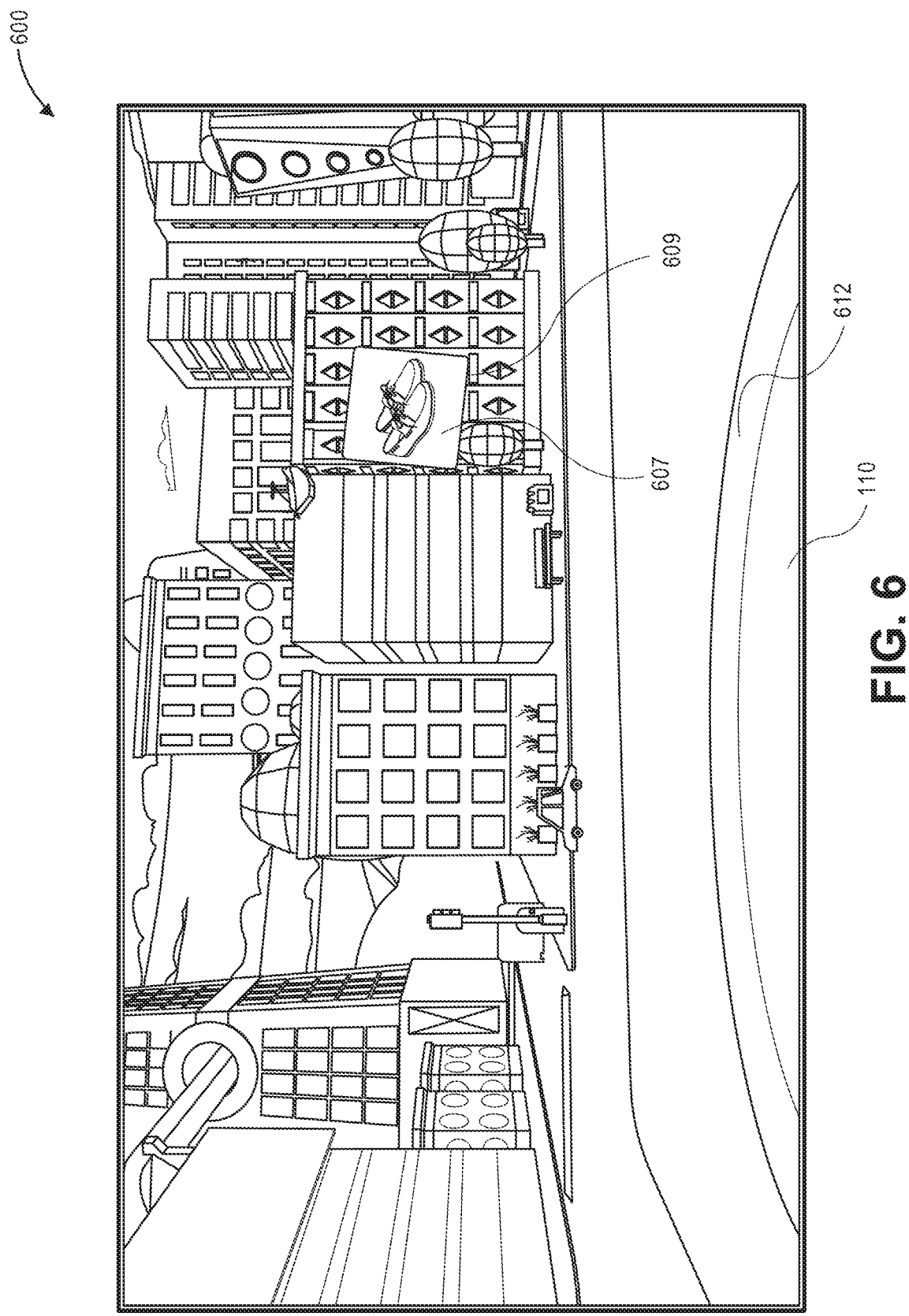
FIG. 6 is a schematic diagram of a sixth example view of a virtual reality user interface, according to an implementation.

FIG. 6 is a schematic diagram of a sixth example view 600 of a virtual reality user interface, according to an implementation.

As shown in FIG. 6, a user may have performed an action or provided an input that scrolls, moves, or zooms a cell or subcell beyond an allowable range. For example, the user may have attempted to move, place, or zoom out the cell or subcell beyond an allowable range away from a position of the user, e.g., via one or more inputs received via the virtual reality device, a controller, or a voice input, that results in an indication of a scroll/zoom limit. One example input to alter a level of zoom may be a vertical swipe motion or gesture received via an input element of a controller in communication with the virtual reality device. Other example inputs may be single-click, double-click, swipe, click-hold-move-release, or click-hold-pull inputs of an input element of a controller in communication with the virtual reality device.

Responsive to the action or input from the user that results in scrolling, moving, or zooming a cell or subcell beyond an allowable range, scroll/zoom limit visual characteristics may be selected for the interaction area 110 and border 612. For example, the interaction area 110 may be substantially green and the border 612 may be substantially purple as compared to the default visual characteristics. In addition, the substantially purple border 612 may be slightly enlarged and/or may include a texture such that it appears fuzzy or partially translucent. Further, the substantially green interaction area 110 and the substantially purple border 612 may include various movements or animations such as a pulsing visual pattern that repeats between the interaction area 110 and the border 612, such that an outer portion of the interaction area 110 may appear to change to substantially purple starting from the purple border 612 and filling in toward the center of the interaction area 110, and then the outer portion of the interaction area 110 may appear to change back to substantially green starting from the center of the interaction area 110 and extending toward the purple border 612.

Further, the border 612 and/or the interaction area 110 may also include one or more indicia, signs, symbols, text, or other communications or feedback to the user. For example, the indicia or text may include prompts or symbols indicating that the cell or subcell has reached a scrolling, movement, or zooming limit, or any other indicia or text related to the user inputs or actions. Further, one or more audio sounds or prompts, e.g., a ping, a tone, a chord, a message, or other notification, may also be provided together with the visual prompts or symbols. In some embodiments in which the user input is a movement of a cell or subcell beyond an allowable range, after indicating a movement limit of the cell or subcell, the virtual reality user interface may return to a view similar to that of FIG. 1 that includes a plurality of cells and subcells including respective images, and the interaction area 110 and border 612 may revert to include default visual characteristics including a substantially green interaction area 110 and a substantially blue border 112.

Moreover, in some embodiments, one or more cells or subcells may also include visual effects or changes that correspond to the selected visual characteristics for the interaction area 110 and/or the border 612. For example, as shown in FIG. 6, upon scrolling, moving, or zooming a cell or subcell 607 beyond an allowable range, a color of the border 609 of the cell or subcell 607 may further be temporarily changed to match the change in color of the border 612 as further indication of the movement limit. Likewise, scrolling, moving, or zooming a cell or subcell beyond an allowable range may result in a corresponding visual effect or change associated with the cell or subcell, e.g., temporarily filling the cell or subcell with a color to match the change in color of the border 612, or other visual effects or changes.

Furthermore, similar to the example view shown in FIG. 5, upon scrolling, moving, or zooming a cell or subcell beyond an allowable range, one or more purple bands or regions may further be temporarily rendered around the moved cell or subcell as further indication of the movement limit. For example, a lower purple band, or a portion thereof, near a base of the maximum distance from the position of the user may be temporarily rendered below the moved cell or subcell, and/or a purple band, or a portion thereof, near a position of the maximum distance of the moved cell or subcell may be temporarily rendered on, behind, and/or near the moved cell or subcell. In additional embodiments, a purple region, cloud, ring, halo, star, or other shape around a position of the maximum distance of the moved cell or subcell may be temporarily rendered on, behind, and/or near the moved cell or sub cell. Further embodiments may also include visual effects such as lines, sparks, rings, waves, illuminations, glows, movements, animations, or other effects, e.g., emanating from or near a position of the user and/or from the interaction area or border, that may appear to initiate, activate, and/or connect with the one or more bands or regions described herein.

Figure 7:
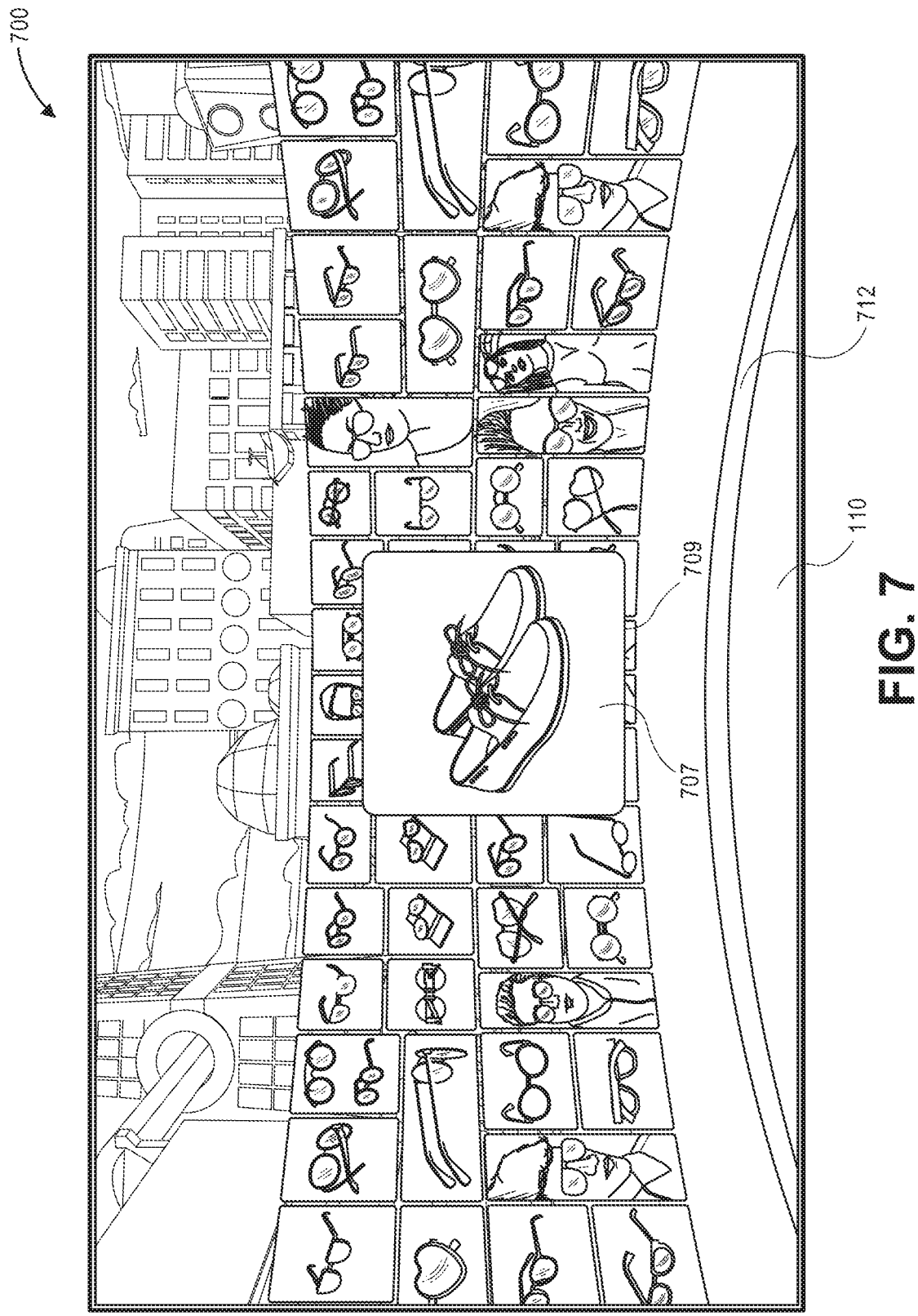
FIG. 7 is a schematic diagram of a seventh example view of a virtual reality user interface, according to an implementation.

FIG. 7 is a schematic diagram of a seventh example view 700 of a virtual reality user interface, according to an implementation.

As shown in FIG. 7, a user may have performed an action or provided an input that indicates an expansion of a cell or subcell to view additional details and/or additional cells or subcells associated with the expanded cell or subcell. For example, the user may have selected and pulled or zoomed the cell or subcell toward a position of the user, e.g., via one or more inputs received via the virtual reality device, a controller, or a voice input, that results in an indication of expansion of the cell or subcell. One example input to alter a level of zoom may be a vertical swipe motion or gesture received via an input element of a controller in communication with the virtual reality device. Other example inputs may be single-click, double-click, swipe, click-hold-move-release, or click-hold-pull inputs of an input element of a controller in communication with the virtual reality device.

Responsive to the action or input from the user that results in an expansion of a cell or subcell, expansion visual characteristics may be selected for the interaction area 110 and border 712. For example, the interaction area 110 may be substantially green and the border 712 may also be substantially green as compared to the default visual characteristics. In addition, the substantially green border 712 may be slightly enlarged and/or may include a texture such that it appears fuzzy or partially translucent. Further, the substantially green interaction area 110 and the substantially green border 712 may include various movements or animations such as a pulsing visual pattern that repeats between the interaction area 110 and the border 712, such that an outer portion of the interaction area 110 may appear to change to substantially green starting from the green border 712 and filling in toward the center of the interaction area 110, and then the outer portion of the interaction area 110 may appear to change back to substantially green starting from the center of the interaction area 110 and extending toward the green border 712. The particular wavelengths of the color green associated with each of the interaction area 110 and the border 712 may be slightly different in order to allow a user to visually perceive the change to a substantially green border 712, as well as various movements or animations such as the pulsing visual pattern between the interaction area 110 and the border 712.

Further, the border 712 and/or the interaction area 110 may also include one or more indicia, signs, symbols, text, or other communications or feedback to the user. For example, the indicia or text may include prompts or symbols indicating that the cell or subcell will be expanded to render additional details and/or additional cells and subcells, or any other indicia or text related to the user inputs or actions. Further, one or more audio sounds or prompts, e.g., a ping, a tone, a chord, a message, or other notification, may also be provided together with the visual prompts or symbols. In some embodiments in which the user input is an expansion of a cell or subcell related to the particular item, after indicating the expansion of the cell or subcell, the virtual reality user interface may return to a view similar to that of FIG. 1 that includes a plurality of cells and subcells including respective images related to the particular item, and the interaction area 110 and border 712 may revert to include default visual characteristics including a substantially green interaction area 110 and a substantially blue border 112.

Moreover, in some embodiments, one or more cells or subcells may also include visual effects or changes that correspond to the selected visual characteristics for the interaction area 110 and/or the border 712. For example, as shown in FIG. 7, upon selecting and pulling or zooming a cell or subcell 707 toward a position of a user, a color of the border 709 of the cell or subcell 707 may further be temporarily changed to match the change in color of the border 712 as further indication of the expansion of the cell or subcell. Likewise, selecting and pulling or zooming a cell or subcell toward a position of a user may result in a corresponding visual effect or change associated with the cell or subcell, e.g., temporarily filling the cell or subcell with a color to match the change in color of the border 712, or other visual effects or changes.

Figure 8:
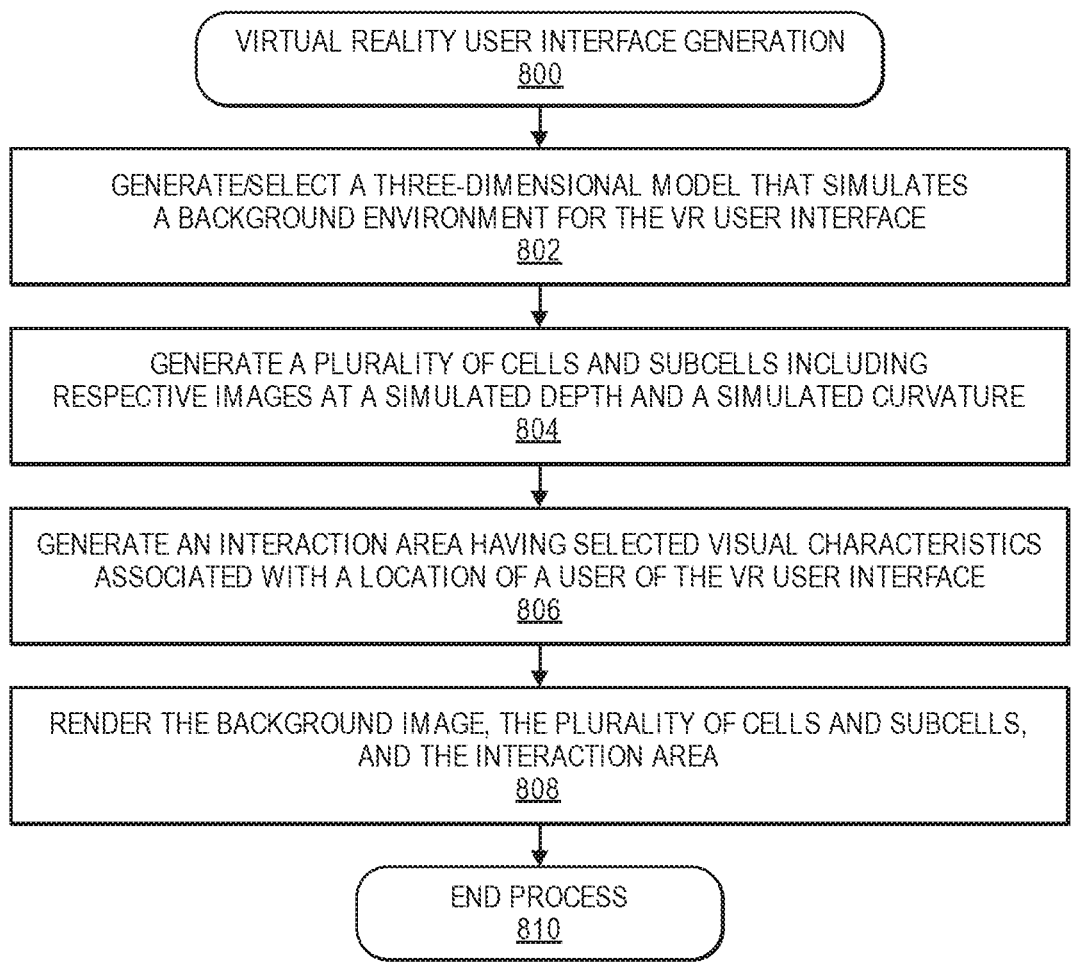
FIG. 8 is a flow diagram illustrating an example virtual reality user interface generation process, according to an implementation.

FIG. 8 is a flow diagram illustrating an example virtual reality user interface generation process 800, according to an implementation.

The process 800 may begin by generating or selecting a three-dimensional model that simulates a background scene or environment for the virtual reality user interface, as at 802. For example, the three-dimensional model may simulate a default image, scene, or environment. In some embodiments, a user may select a particular three-dimensional model that simulates a background scene or environment, or a theme associated with various three-dimensional models, e.g., cityscapes, national parks, museums, restaurants, cafes, or others. In addition, in other embodiments, a three-dimensional model may be selected based at least in part on user preferences, user input, user selection, search queries, currently viewed items, viewing history, purchasing history, or any other factors. For example, if a user is currently searching for winter coats, a three-dimensional model may be selected that is potentially related to winter coats, e.g., snowcapped mountains, a ski resort, an urban area or public park in the fall/winter, or others. Further, the three-dimensional model may be sized to approximately correspond to a real-world environment, in order to provide visual cues and context to orient a user of a virtual reality device.

The process 800 may continue by generating a plurality of cells and subcells including respective images at a simulated depth and a simulated curvature, as at 804. For example, the plurality of cells and subcells may be arranged in a grid pattern overlaying at least a portion of the three-dimensional model. The plurality of cells and subcells may appear to be positioned between a position of a user and the three-dimensional model that simulates a background environment, e.g., at a simulated depth between approximately eight feet and approximately twelve feet in front of the user. In addition, the plurality of cells and subcells may appear to wrap or extend around a position of the user, e.g., at a simulated curvature with a position of the user as an approximate center point.

In addition, each of the plurality of cells and subcells may include respective images from a plurality of images. The plurality of images may be obtained or received from a catalog service, an electronic commerce service, or other similar service. For example, an online retailer may maintain a catalog of items, including images, data, and other details associated with each of the items. Based at least in part on an input from a user, e.g., a search query, a user selection, user history, or other inputs, a plurality of images related to the input may be requested and received from the catalog service. If multiple images are received for a single item, one of the images may be designated as a primary image, or various image processing and analysis may be performed upon the multiple images to identify a most representative image of the item.

Further, each of the plurality of cells and subcells may be sized based at least in part on an aspect ratio of a respective image. For example, aspect ratios for each of the images may be determined, and then, the images may be grouped based on the determined aspect ratios such that each group of images approximately fits within a cell without creating excess empty space or gaps between subcells and cells. Moreover, one or more of the plurality of cells may be divided into a plurality of subcells that are sized based at least in part on the aspect ratios of the respective images. For example, based on the determined aspect ratios and/or groups of images, each cell may be divided into a plurality of subcells to accommodate a group of images.

The process 800 may then continue by generating an interaction area having selected visual characteristics associated with a location of a user of the virtual reality user interface, as in 806. For example, the interaction area may include a border, and the interaction area and the border may each include visual characteristics that are selected from a plurality of visual characteristics, e.g., based on user input or actions, or states or conditions of the virtual reality device, application, or system. In addition, the interaction area and border may be centered with respect to the location of the user within the virtual reality environment, and/or may appear to move to or arrive at the location of the user.

The process 800 may then proceed to render the three-dimensional model, the plurality of cells and subcells, and the interaction area, as at 808. Each of the plurality of cells and subcells may include a respective image and be sized based at least in part on a respective aspect ratio of the respective image. The plurality of cells and subcells may begin at a home position that is approximately in front of an initial field of view of a user at a simulated depth, and the plurality of cells and subcells may extend or wrap around a position of the user at a simulated curvature. In addition, the interaction area and/or the border may be rendered at a location of the user, e.g., at a base of the location of the user, in the virtual reality environment with selected visual characteristics, e.g., colors, illuminations, patterns, textures, or other characteristics. Alternatively or in addition, the interaction area and/or the border may be rendered above a location of the user, e.g., simulating a roof or ceiling associated with the location of the user. In some example embodiments, a user may be able to select one or both of the interaction area and/or the border rendered at the base of the location of the user or above the location of the user. In further example embodiments, the virtual reality system, device, or application may automatically select one or both of the interaction area and/or the border rendered at the base of the location of the user or above the location of the user, e.g., based on a viewing direction of the user, a current field of view of the user, other user interface elements displayed to the user, other aspects of the user interface, or any other factors. The process 800 may then end, as at 810.

Figure 9:
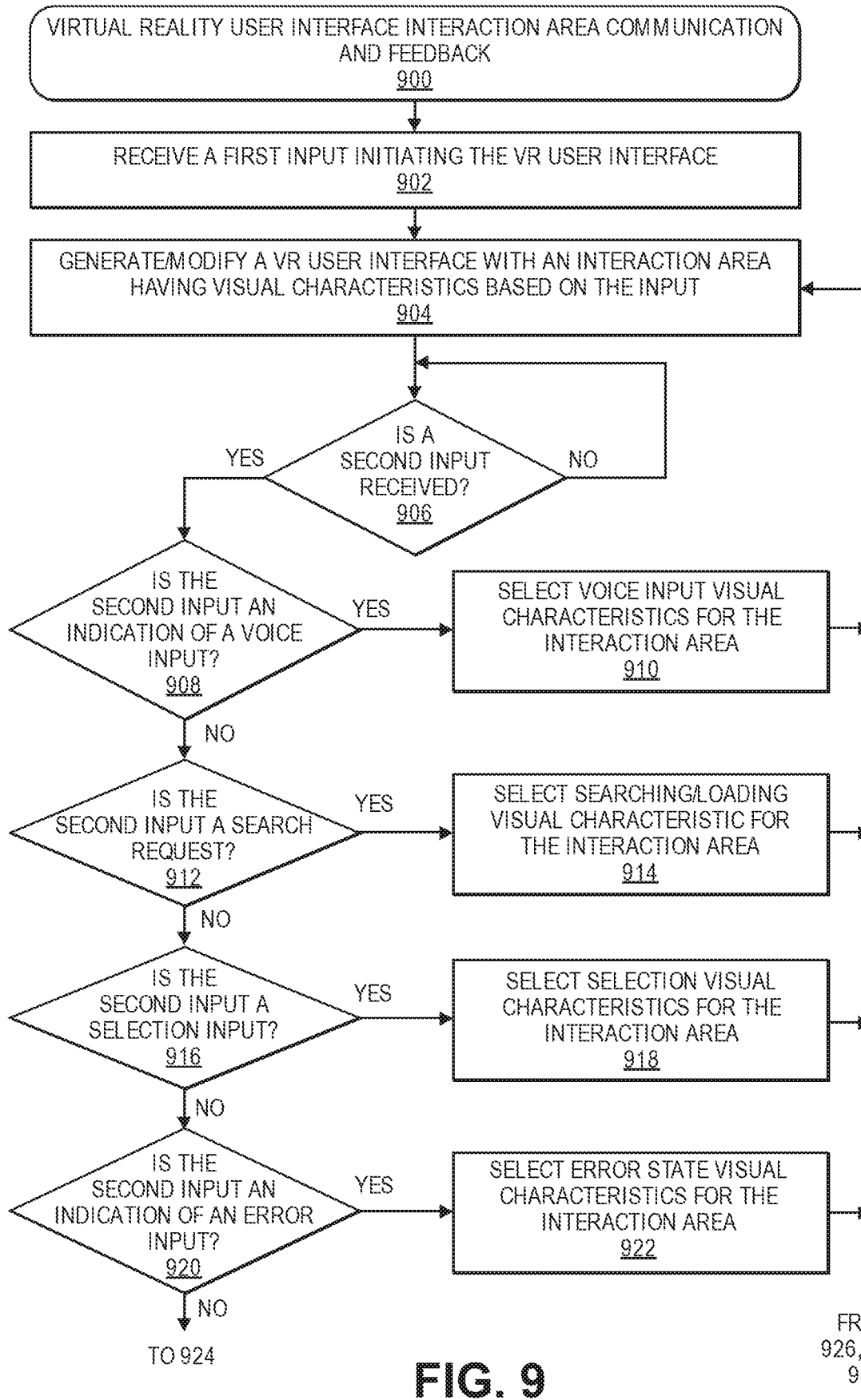
FIG. 9 is a flow diagram illustrating an example virtual reality user interface interaction area communication and feedback process, according to an implementation.
Figure 9:
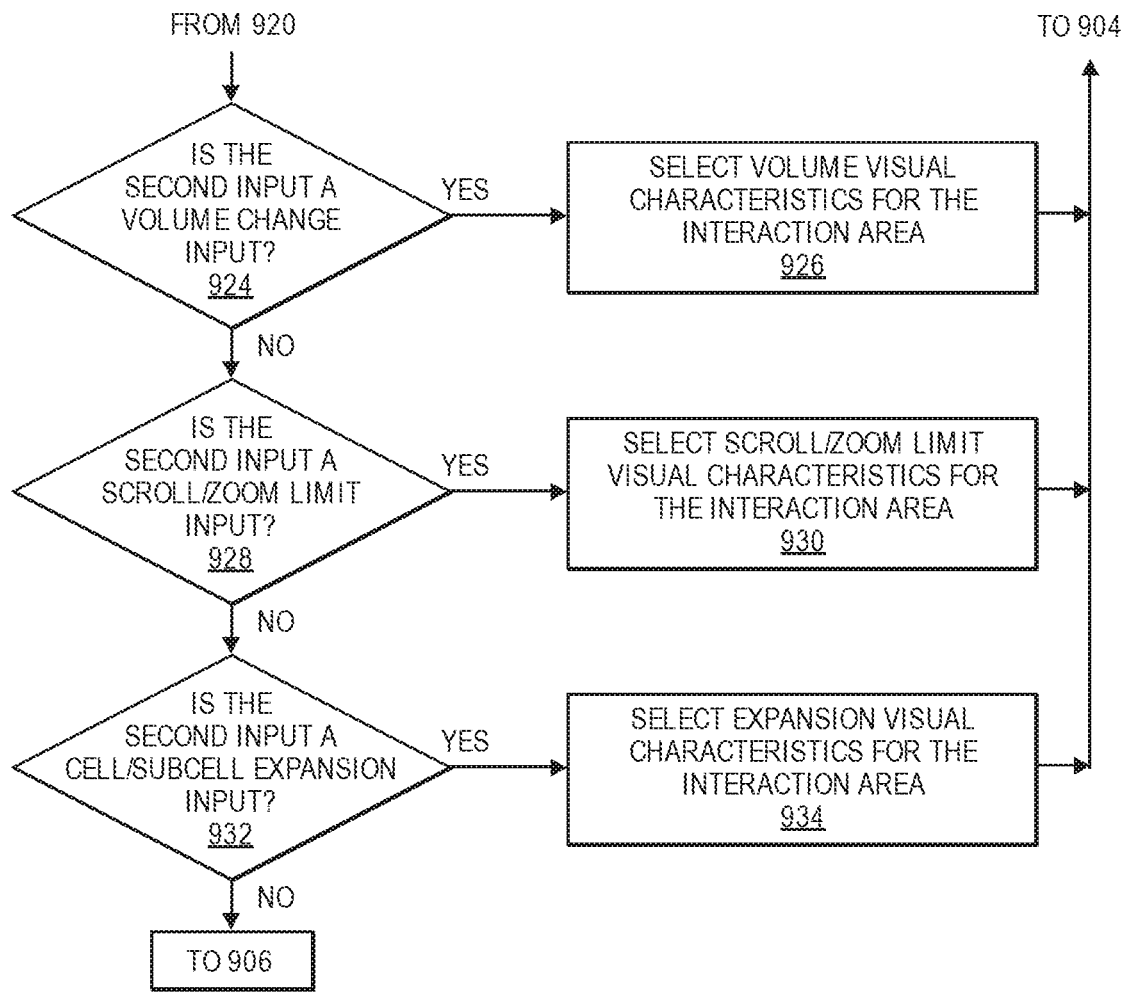

FIG. 9 is a flow diagram illustrating an example virtual reality user interface interaction area communication and feedback process 900, according to an implementation.

The process 900 may begin by receiving a first input initiating, activating, or launching the virtual reality user interface, as at 902. For example, the first input may comprise a startup of the virtual reality user interface, an initiation of a virtual reality device, a launching of a virtual reality application, or other initiation of a virtual reality device, application, or system. The first input may be received by various input methods, e.g., via one or more inputs received via the virtual reality device, a controller, or a voice input. Based at least in part on the first input, the process 900 may continue by generating a virtual reality user interface with an interaction area having visual characteristics that are selected based at least in part on the first input, as at 904, and as described with respect to FIG. 8. In some example embodiments, as described herein, the interaction area may be rendered with default visual characteristics including a substantially green interaction area and a substantially blue border.

The process 900 may then proceed by determining whether a second input is received, as at 906. For example, the second input may be received by various input methods, e.g., via one or more inputs received via the virtual reality device, a controller, or a voice input. If not, the process 900 may continue to monitor whether a second input is received. If a second input is received at 906, then the process 900 may proceed to determine information related to the second input, e.g., a type, an indication, an action, or other information related to the second input.

For example, the process 900 may determine whether the second input is an indication of a voice input, as at 908. If the second input is an indication of a voice input, then the process 900 may continue to select voice input visual characteristics for the interaction area, as at 910. In some example embodiments, as described herein, the voice input visual characteristics may include a substantially green interaction area and a substantially cyan border, in which the substantially cyan border may appear to extend at least partially vertically to create a vertical wall at a simulated depth between the simulated depth of the plurality of cells and subcells and a position of the user, and at a simulated curvature similar to the simulated curvature of the plurality of cells and subcells. In addition, the border, the vertical wall, and/or the interaction area may also include one or more indicia, signs, symbols, text, or other communications or feedback to the user, e.g., prompts, symbols, indicia, or text related to voice input. Further, one or more audio sounds or prompts, e.g., a ping, a tone, a chord, a message, or other notification, may also be provided together with the visual prompts or symbols. Then, the process 900 may return to step 904 to modify the virtual reality user interface with the interaction area having the selected visual characteristics, e.g., voice input visual characteristics, based on the second input.

If it is determined that the second input is not an indication of a voice input at 908, the process 900 may continue to determine whether the second input is a search request or other input that requires searching/loading of information, as at 912. If the second input is a search request or other similar input, then the process 900 may continue to select searching/loading visual characteristics for the interaction area, as at 914. In some example embodiments, as described herein, the searching/loading visual characteristics may include a substantially green interaction area and a substantially blue border that may appear fuzzy or partially translucent, and may include various movements or animations such as a pulsing visual pattern. In addition, the border and/or the interaction area may also include one or more indicia, signs, symbols, text, or other communications or feedback to the user, e.g., prompts, symbols, indicia, or text related to user inputs or actions. Further, one or more audio sounds or prompts, e.g., a ping, a tone, a chord, a message, or other notification, may also be provided together with the visual prompts or symbols. Then, the process 900 may return to step 904 to modify the virtual reality user interface with the interaction area having the selected visual characteristics, e.g., searching/loading visual characteristics, based on the second input.

If it is determined that the second input is not an indication of a voice input at 908 or a search request or other similar input at 912, the process 900 may continue to determine whether the second input is a selection input, e.g., selection of a cell, subcell, or other selectable option, as at 916. If the second input is a selection input, then the process 900 may continue to select selection visual characteristics for the interaction area, as at 918. In some example embodiments, as described herein, the selection visual characteristics may include a substantially green interaction area and a substantially orange border that may appear fuzzy or partially translucent, and may include various movements or animations such as a pulsing visual pattern. In addition, the border and/or the interaction area may also include one or more indicia, signs, symbols, text, or other communications or feedback to the user, e.g., prompts, symbols, indicia, or text related to user inputs or actions. Further, one or more audio sounds or prompts, e.g., a ping, a tone, a chord, a message, or other notification, may also be provided together with the visual prompts or symbols. Then, the process 900 may return to step 904 to modify the virtual reality user interface with the interaction area having the selected visual characteristics, e.g., selection visual characteristics, based on the second input.

If it is determined that the second input is not an indication of a voice input at 908, a search request or other similar input at 912, or a selection input at 916, the process 900 may continue to determine whether the second input is an indication of an error input, as at 920. If the second input is an indication of an error state, then the process 900 may continue to select error state visual characteristics for the interaction area, as at 922. In some example embodiments, as described herein, the error state visual characteristics may include a substantially green interaction area and a substantially red border that may appear fuzzy or partially translucent, and may include various movements or animations such as a pulsing visual pattern. In addition, the border and/or the interaction area may also include one or more indicia, signs, symbols, text, or other communications or feedback to the user, e.g., prompts, symbols, indicia, or text related to user inputs or actions, or system or device states or conditions, that result in an error state. Further, one or more audio sounds or prompts, e.g., a ping, a tone, a chord, a message, or other notification, may also be provided together with the visual prompts or symbols. Then, the process 900 may return to step 904 to modify the virtual reality user interface with the interaction area having the selected visual characteristics, e.g., error state visual characteristics, based on the second input.

If it is determined that the second input is not an indication of a voice input at 908, a search request or other similar input at 912, a selection input at 916, or an indication of an error input at 920, the process 900 may continue to determine whether the second input is a volume change input, as at 924. If the second input is a volume change input, then the process 900 may continue to select volume visual characteristics for the interaction area, as at 926. In some example embodiments, as described herein, the volume visual characteristics may include a substantially white interaction area and a substantially purple border that may appear fuzzy or partially translucent, and may include a range of relative proportions between the white interaction area and the purple border corresponding to a range of volume. In other example embodiments, the volume visual characteristics may include a substantially purple interaction area and/or border, and a portion of the interaction area and/or border near a center of a field of view of the user may change to a substantially white interaction area and/or border, in which the relative size of the central portion of the interaction area and/or border is proportional to a current volume setting. For example, the central portion may have a pie shape, with a smaller substantially white pie shape within the substantially purple interaction area and/or border indicating a lower volume setting than a larger substantially white pie shape within the substantially purple interaction area and/or border that indicates a higher volume setting. In addition, the border and/or the interaction area may also include one or more indicia, signs, symbols, text, or other communications or feedback to the user, e.g., prompts, symbols, indicia, or text related to user inputs or actions related to volume or volume changes. Further, one or more audio sounds or prompts, e.g., a ping, a tone, a chord, a message, or other notification, may also be provided together with the visual prompts or symbols. Then, the process 900 may return to step 904 to modify the virtual reality user interface with the interaction area having the selected visual characteristics, e.g., volume visual characteristics, based on the second input.

If it is determined that the second input is not an indication of a voice input at 908, a search request or other similar input at 912, a selection input at 916, an indication of an error input at 920, or a volume change input at 924, the process 900 may continue to determine whether the second input is a scroll/zoom limit input, as at 928. If the second input is a scroll/zoom limit input, then the process 900 may continue to select scroll/zoom limit visual characteristics for the interaction area, as at 930. In some example embodiments, as described herein, the scroll/zoom limit visual characteristics may include a substantially green interaction area and a substantially purple border that may appear fuzzy or partially translucent, and may include various movements or animations such as a pulsing visual pattern. In addition, the border and/or the interaction area may also include one or more indicia, signs, symbols, text, or other communications or feedback to the user, e.g., prompts, symbols, indicia, or text related to user inputs or actions related to a scrolling, movement, or zooming limit. Further, one or more audio sounds or prompts, e.g., a ping, a tone, a chord, a message, or other notification, may also be provided together with the visual prompts or symbols. Then, the process 900 may return to step 904 to modify the virtual reality user interface with the interaction area having the selected visual characteristics, e.g., scroll/zoom limit visual characteristics, based on the second input.

If it is determined that the second input is not an indication of a voice input at 908, a search request or other similar input at 912, a selection input at 916, an indication of an error input at 920, a volume change input at 924, or a scroll/zoom limit input at 928, the process 900 may continue to determine whether the second input is a cell/subcell expansion input, as at 932. If the second input is a cell/subcell expansion input, then the process 900 may continue to select expansion visual characteristics for the interaction area, as at 934. In some example embodiments, as described herein, the expansion visual characteristics may include a substantially green interaction area and a substantially green border that may appear fuzzy or partially translucent, and may include various movements or animations such as a pulsing visual pattern. In addition, the border and/or the interaction area may also include one or more indicia, signs, symbols, text, or other communications or feedback to the user, e.g., prompts, symbols, indicia, or text related to user inputs or actions related to cell or subcell expansion. Further, one or more audio sounds or prompts, e.g., a ping, a tone, a chord, a message, or other notification, may also be provided together with the visual prompts or symbols. Then, the process 900 may return to step 904 to modify the virtual reality user interface with the interaction area having the selected visual characteristics, e.g., expansion visual characteristics, based on the second input.

If it is determined that the second input is not an indication of a voice input at 908, a search request or other similar input at 912, a selection input at 916, an indication of an error input at 920, a volume change input at 924, a scroll/zoom limit input at 928, or a cell/subcell expansion input at 932, the process 900 may return to step 906 to continue to determine whether a second input is received and/or a type, an indication, an action, or other information related to the second input.

Although FIG. 9 shows a particular sequence of steps or operations, the illustrated sequence is merely illustrative and is not intended to limit the disclosure herein. For example, various types of inputs may be received in a variety of combinations or sequences, e.g., one or more inputs using any of various input methods may be received in any combination or sequence. FIG. 9 merely provides an example sequence to illustrate some of the possible inputs and some of the possible visual characteristics for interaction areas associated with the virtual reality user interfaces described herein, and FIG. 9 is not intended to limit or preclude any other combinations or sequences of inputs by which users may interact with the virtual reality user interfaces described herein, which may result in various corresponding visual characteristics for interaction areas.

For example, in one example combination or sequence of inputs, a virtual reality device, application, or system may be initiated, such that the interaction area transitions from initiation visual characteristics to default visual characteristics. Then, a volume change input may be received, such that the interaction area includes volume visual characteristics. Then, an indication of a voice input may be received, such that the interaction area includes voice input visual characteristics. However, the device, application, or system may not be able to decipher a first voice input, such that the interaction area includes error state visual characteristics. Then, a second voice input may be received and processed, such the interaction area includes searching/loading visual characteristics. After generating and/or modifying the virtual reality user interface to display results related to the second voice input, the device, application, or system may return to a passive or waiting state, such that the interaction area includes default visual characteristics, until further inputs are received.

In another example combination or sequence of inputs, a virtual reality device, application, or system may have previously generated a virtual reality user interface and be in a passive or waiting state, such that the interaction area includes default visual characteristics, until further inputs are received. Then, a selection of a cell or subcell may be received, such that the interaction area includes selection visual characteristics. Then, zooming out or other movement of the cell or subcell toward a scroll/zoom limit may be received, such that the interaction area includes scroll/zoom limit visual characteristics. Then, zooming in of the cell or subcell toward a position of the user may be received, such that the interaction area includes expansion visual characteristics. The cell/subcell expansion input may then be processed, such that the interaction area includes searching/loading visual characteristics. After generating and/or modifying the virtual reality user interface to display results related to the cell/subcell expansion input, the device, application, or system may return to a passive or waiting state, such that the interaction area includes default visual characteristics, until further inputs are received.

In still other example combinations or sequences of inputs, two or more actions or inputs may result in two or more different possible changes to visual characteristics of the interaction area at substantially the same time. In such situations, one of the possible changes to the visual characteristics of the interaction area may be selected over one or more other possible changes to the visual characteristics of the interaction area, e.g., based on a defined hierarchy or order of precedence or importance related to the various visual characteristics, such that only the selected changes to the visual characteristics of the interaction area are displayed or presented to the user.

Figure 10:
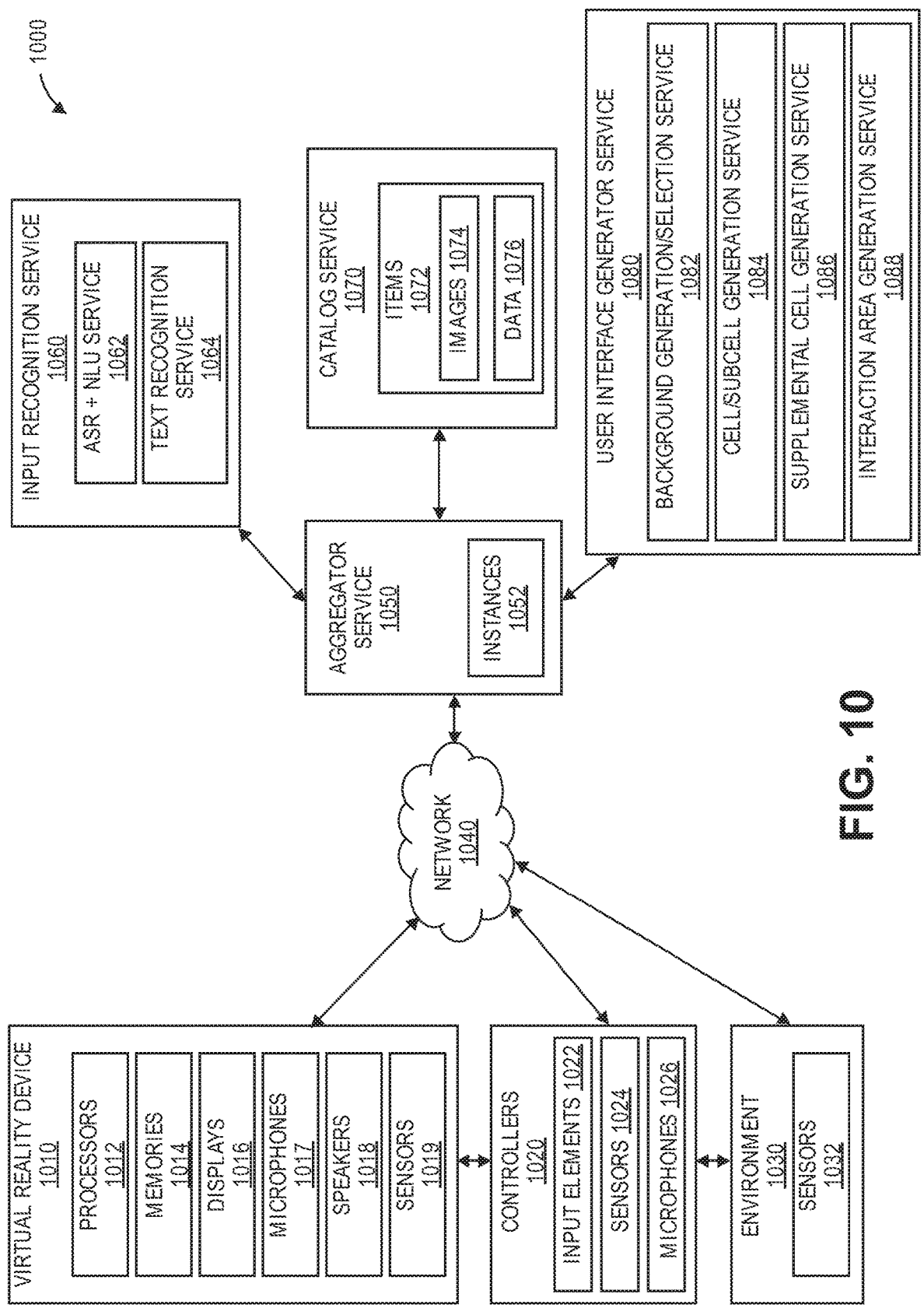
FIG. 10 is a block diagram illustrating various components of a virtual reality system, according to an implementation.

FIG. 10 is a block diagram illustrating various components of a virtual reality system 1000, according to an implementation.

In various examples, the block diagram may be illustrative of one or more aspects of the virtual reality system 1000 that may be used to implement the various systems and processes discussed above. In the illustrated implementation, the virtual reality system 1000 includes a virtual reality device 1010 having one or more associated controllers 1020 and operating within an environment 1030. The virtual reality device 1010, the one or more controllers 1020, and/or the environment 1030 may be in communication with each other and with a network 1040. In addition, an aggregator service 1050 may also be in communication with the network 1040, and the aggregator service 1050 may be in communication with or otherwise operatively connected to one or more of an input recognition service 1060, a catalog service 1070, a user interface generation service 1080, and/or other services.

The virtual reality device 1010 may include one or more processors 1012 in communication with one or more memories 1014, one or more presentation devices or displays 1016, one or more microphones 1017, one or more speakers 1018, and/or one or more sensors 1019. The virtual reality device 1010 may comprise an integrated headset and computing device, a computing device such as a laptop computer, desktop computer, or other stationary computing device in communication with a headset, a removable and/or portable computing device such as a smartphone or cellular phone coupled with a headset, or any other computing device configured to provide a virtual reality user interface for presentation to a user. The processors 1012 may process, transmit, receive, store, and/or retrieve data, e.g., in communication with the memories 1014 and/or via the network 1040, in which the data may be associated with users, items, inputs, user interface elements, or any other aspects described herein.

The presentation devices or displays 1016 or other visual output components may render for presentation to a user of the virtual reality device 1010 the user interface elements, item images, item data, input elements, or any other aspects described herein. For example, the presentation devices or displays 1016 may be stereoscopic displays that are configured to render a three-dimensional, virtual reality environment to a user. In addition, the speakers 1018 or other audio output components may emit to a user of the virtual reality device 1010 any audio output associated with the user interface elements, item images, item data, input elements, or any other aspects described herein. For example, background music may be associated with one or more portions of a three-dimensional model that simulates a background environment, with one or more items or types of items, and/or with one or more positions of the virtual reality user interfaces described herein, such that the background music may change in response to visual changes associated with various portions or sections of the virtual reality user interfaces. Further, the virtual reality device 1010 may also include haptic output components that may emit haptic signals or feedback, e.g., related to any of the various inputs that may be received from a user such as clicks, swipes, holds, or releases, confirmations of various actions such as indicating an interest in an item, adding an item to a cart, or completing a purchase of an item, indications related to the virtual reality user interface such as reaching an end position of the user interface, or any other aspects of the virtual reality user interfaces or interactions therewith by a user as described herein.

The microphones 1017 or other audio input components may receive inputs, e.g., voice inputs, from a user of the virtual reality device 1010. For example, a user may provide a search query via a voice input that is received by the microphones 1017 and processed to provide visual and/or audio output, e.g., via the presentation devices or displays 1016 and speakers 1018, associated with the search query.

In some embodiments, the microphones 1017 may be always activated while a user is using the virtual reality device 1010, such that audio inputs may be received by the microphones 1017 at any time. In addition, an initial or wake-up word or phrase may be used to signal to the virtual reality device 1010 that the user intends to provide a voice input. In other embodiments, the microphones 1017 may be activated by an input element, e.g., within the user interface or on a controller, such that audio inputs may be received by the microphones 1017 responsive to selection of the input element. In still other embodiments, the microphones 1017 may be additionally or alternatively activated or triggered by one or more sensors within one or more of the virtual reality device 1010, the controllers 1020, or the environment 1030. For example, a particular motion of the virtual reality device 1010 as sensed by sensors 1019, a particular motion of the controller 1020 as sensed by sensors 1024, and/or a particular motion of the user as sensed by sensors 1032 may initiate activation of the microphones 1017. In one example embodiment, a sensor 1024 of the controller 1020 may sense a motion of the controller 1020 toward a user's mouth as a trigger to initiate activation of the microphones 1017, even if the microphones 1017 are not physically present within the controller 1020. Further, a label or sticker indicating a microphone may be provided on the controller 1020 to suggest or encourage such action or motion by the user even in the absence of a microphone on the controller 1020.

The sensors 1019 of the virtual reality device 1010 may include one or more accelerometers, gyroscopes, magnetometers, or other sensors. For example, the sensors 1019 may provide data associated with a position, orientation, movement, rotation, speed, or other action or motion of the user utilizing the virtual reality device 1010. In some implementations, the virtual reality device 1010 may be a virtual reality headset that may sense, using one or more of the sensors 1019, various movements of a head of a user, e.g., looking up, down, left, right, or combinations thereof. Further, the sensors 1019 may also include eye gaze tracking sensors that may identify a direction of eye gaze or focus of the user, and the sensed direction of eye gaze or focus may be used as additional inputs for the systems and processes described herein. For example, a sensed direction of eye gaze toward a cell or subcell for a defined amount of time, e.g., 2-5 seconds or longer, may be detected by the eye gaze tracking sensors and recognized as an input such as a selection of the cell or subcell. As another example, a sensed blink of an eye by a user for a defined amount of time, together with a sensed direction of eye gaze, may also be detected by the eye gaze tracking sensors and recognized as an input such as a selection of a cell or subcell. As yet another example, a sensed movement of eye gaze, or a sensed position of eye gaze, e.g., at an edge of the field of view, may also be detected by the eye gaze tracking sensors and recognized as an input such as a scrolling or panning input.

The controllers 1020 may include one or more input elements 1022. For example, the input elements 1022 may include buttons, triggers, switches, toggles, trackballs, trackpads, touchpads, touch-sensitive surfaces, or any other elements configured to receive inputs from a user. The inputs received via the input elements 1022 may be general navigation inputs related to the user interface as a whole, e.g., swiping left or right to pan or scroll the user interface left or right or swiping up or down to alter a level of zoom, may be specific navigation inputs related to one or more aspects or elements within the user interface, e.g., swiping left or right to view additional images or details of one or more items, or may be control or selection inputs specific to one or more aspects or elements rendered by the presentation devices or displays 1016, e.g., selection, removal, placement, expansion, modification, or other interaction with a particular user interface element or entry of text via a keyboard rendered on the presentation devices or displays 1016.

For example, the input elements 1022 may include a primary clickable trackpad, a secondary button, a universal home button, and volume up and down buttons, although other combinations of input elements are also possible. The primary clickable trackpad may receive touch, swipe, single-click, double-click, click and hold, click and swipe, click and pull, or any other inputs described herein. In example embodiments, the swipe, double-click, click and hold, click and swipe, and click and pull inputs described herein may be received via a primary clickable trackpad. In addition, the secondary button may receive single-click, double-click, click and hold, click and pull, or any other inputs described herein. Further, the universal home button may receive single-click, double-click, click and hold, or any other inputs described herein. In an example embodiment, the click and hold input received via a universal home button may redefine or re-center the home position within a current field of view of a user. In another example embodiment, the single-click input received via a universal home button may exit an application or service that renders the virtual reality user interfaces described herein, and return the user to a universal home screen associated with the virtual reality device.

In addition, the controllers 1020 may include one or more sensors 1024. For example, the sensors 1024 may include one or more accelerometers, gyroscopes, magnetometers, image capture devices, or other sensors. For example, the sensors 1024 may provide data associated with a position, orientation, movement, rotation, speed, or other action or motion of the controller by a user. In addition, the image capture devices may capture images of actual surroundings of a user in order to perform inside-out tracking. For example, inside-out tracking may include determining frame-to-frame changes of images captured by such image capture devices in order to determine position, orientation, movement, rotation, speed, or other action or motion of the controller by a user. Moreover, data captured and/or received by one or more of the sensors 1024 may be used together to more accurately determine any of the various aspects related to action or motion of the controller. Further, the controllers 1020 may include one or more microphones 1026 to receive voice inputs. As described herein, the microphones 1026 may be always activated, activated by one or more input elements, and/or activated by one or more triggers such as sensed motions of one or more components.

Further, the controllers 1020 may also include haptic output components that may emit haptic signals or feedback, e.g., related to any of the various inputs that may be received from a user such as clicks, swipes, holds, or releases, confirmations of various actions such as indicating an interest in an item, adding an item to a cart, or completing a purchase of an item, indications related to the virtual reality user interface such as reaching an end position of the user interface, or any other aspects of the virtual reality user interfaces or interactions therewith by a user as described herein.

The environment 1030 may also include one or more sensors 1032. For example, the sensors 1032 may include one or more image capture devices, scanning devices, radar sensors, laser sensors, time of flight sensors, location sensors, or other sensors. For example, the sensors 1032 may provide data associated with a position, orientation, movement, rotation, speed, or other actions or motions of one or more of the virtual reality device 1010, the controllers 1020, a user, or combinations thereof. In some embodiments, movements of the virtual reality device 1010, the controllers 1020, and/or the user may be detected by the sensors 1032 and may be associated with one or more actions or inputs described herein. For example, a detected forward movement of a user toward a cell or subcell may result in the selection and display of expansion visual characteristics associated with the interaction area, and a detected backward movement of a user away from a cell, subcell, or plurality of cells or subcells may result in the selection and display of scroll/zoom limit visual characteristics associated with the interaction area. Other visual characteristics of the interaction area described herein may be associated with other detected movements of the virtual reality device 1010, the controllers 1020, and/or the user.

Based at least in part on inputs received via one or more of the microphones 1017, sensors 1019, input elements 1022, sensors 1024, microphones 1026, and/or sensors 1032, a user may be able to control a virtual reality experience or environment and interact with various aspects of the user interface elements, item images, item data, or any other aspects described herein.

In some embodiments, one or more inputs may be processed by the processors 1012 in communication with data stored in the memories 1014 of the virtual reality device 1010 to modify or otherwise effect interactions with the user interface elements, item images, item data, or any other aspects described herein. For example, the processors 1012 and memories 1014 may be configured to locally process and modify one or more aspects of the user interface elements, item images, item data, or any other aspects described herein in response to at least a portion of inputs. In addition or alternatively, one or more inputs may be transmitted, with or without processing by the processors 1012 of the virtual reality device 1010, to the aggregator service 1050 via the network 1040 for processing, analysis, and/or recognition to modify or otherwise effect interactions with the user interface elements, item images, item data, or any other aspects described herein.

The network 1040 may be any wired or wireless general data networks, such as a Wi-Fi network, a local area network (LAN), or a wide area network (WAN). In addition, the network 1040 may include other types of networks, including telecommunications networks, cellular communication networks, satellite networks, the Internet, and the like.

The aggregator service 1050 may include one or more processors, one or more memories, and one or more instances 1052. For example, a particular user using a virtual reality device 1010 with associated controllers 1020 within an environment 1030 may be associated with a particular instance 1052 of the aggregator service 1050. The aggregator service 1050 may serve as an intermediate service via a network 1040 between a plurality of virtual reality devices 1010, each associated with a particular instance 1052 of the aggregator service 1050, and one or more additional services 1060, 1070, 1080 configured to support the operation of each of the virtual reality devices 1010.

The aggregator service 1050 may receive inputs and/or data from the virtual reality device 1010, the controllers 1020, and/or the environment 1030, and in turn, provide to the virtual reality device 1010, the controllers 1020, and/or the environment 1030 data associated with user interface elements, items, or any other aspects described herein. For example, in response to a search query for particular items received from a virtual reality device, the aggregator service 1050 may provide to the virtual reality device data associated with user interface elements, items, or any other aspects described herein related to the search query. Similarly, in response to a selection of a collection of items or items related to a particular item received from a virtual reality device, the aggregator service 1050 may provide to the virtual reality device data associated with user interface elements, items, or any other aspects described herein related to the collection of items or items related to the particular item. Further, in response to a selection of a particular item, the aggregator service 1050 may provide to the virtual reality device data associated with user interface elements, additional item images, additional item details, or any other aspects described herein related to the particular item.

In order to provide to the plurality of virtual reality devices 1010 data related to received inputs and/or data, the aggregator service 1050 may transmit and receive data from one or more additional services, including an input recognition service 1060, a catalog service 1070, a user interface generation service 1080, and/or other services.

The input recognition service 1060 may include one or more processors, one or more memories, an automatic speech recognition and natural language understanding service (ASR+NLU) 1062, and a text recognition service 1064. The input recognition service 1060 may receive inputs and/or data from the aggregator service 1050 and process the inputs and/or data to understand a request from a user. For example, if a user has provided a voice input via one or more microphones 1017, 1026 of the virtual reality device 1010 or the controllers 1020, the ASR+NLU service 1062 may receive the voice input via the aggregator service 1050 and process the voice input to recognize and/or understand a user's request. Likewise, if a user has provided a text input via one or more input elements 1022 of the controllers 1020, the text recognition service 1064 may receive the text input via the aggregator service 1050 and process the text input to recognize and/or understand a user's request. Further, the input recognition service 1060 may also receive and process other inputs provided by a user, e.g., selection of one or more user interface elements, navigation within the user interface, or other inputs. Then, the input recognition service 1060 may transmit data associated with the processed and recognized inputs back to the aggregator service 1050. The transmitted data may be associated with an instance 1052 that is associated with a virtual reality device 1010 from which the initial inputs and/or data were received.

Based at least in part on the data received from the input recognition service 1060, the aggregator service 1050 may transmit a request to the catalog service 1070. The catalog service 1070 may include one or more processors, one or more memories, and data associated with items 1072, including item images 1074, item data 1076, or any other details associated with the items. The items may represent any products or services that may be rendered for display and/or selection by a user of a virtual reality device 1010. For example, the items may be available for rent, download, lease, or purchase. Based at least in part on the request from the aggregator service 1050, the catalog service 1070 may transmit data associated with items, including images, data, and other details, back to the aggregator service 1050 that is related to the request. The transmitted data may be associated with an instance 1052 that is associated with a virtual reality device 1010 from which the initial inputs and/or data were received.

Based at least in part on the data received from the input recognition service 1060 and the data received from the catalog service 1070, the aggregator service 1050 may transmit a request to the user interface generation service 1080. The user interface generation service 1080 may include one or more processors, one or more memories, a background generation/selection service 1082, a cell/subcell generation service 1084, a supplemental cell generation service 1086, and/or an interaction area generation service 1088.

The background generation/selection service 1082 may generate or select a three-dimensional model that simulates a background scene or environment for the user interface to be rendered for a user. As described herein, the three-dimensional model may be a default three-dimensional model, or may be selected based at least in part on user preferences, user input, user selection, search queries, currently viewed items, viewing history, purchasing history, or any other factors. The cell/subcell generation service 1084 may generate the plurality of cells, and also process the images of the items received from the catalog service 1070 in order to divide the cells into subcells. As described herein, the cell/subcell generation service 1084 may determine aspect ratios of the images of the items received from the catalog service 1070 and divide the cells into subcells that are sized based at least in part on the determined aspect ratios of the images. The supplemental cell generation service 1086 may generate one or more supplemental cells that are each associated with a collection of items. The collections of items represented by the supplemental cells may be related to inputs received from the user, or alternatively, one or more of the supplemental cells may represent collections of items that are sponsored or otherwise promoted to one or more users and/or by one or more entities providing the items. The interaction area generation service 1088 may generate an interaction area and a border having visual characteristics that are selected based at least in part on user inputs or actions, or device, application, or system states or conditions.

Based at least in part on the request from the aggregator service 1050, the user interface generation service 1080 may transmit data associated with three-dimensional models, cells, subcells, supplemental cells, interaction areas, user interface elements, and/or any other data, back to the aggregator service 1050 that is related to the request. The transmitted data may be associated with an instance 1052 that is associated with a virtual reality device 1010 from which the initial inputs and/or data were received.

The aggregator service 1050 may then transmit the data associated with three-dimensional models, cells, subcells, supplemental cells, interaction areas, user interface elements, item images, item data or details, and/or any other data to the virtual reality device 1010 that provided the inputs and/or data associated with the instance 1052. The virtual reality device 1010 may then process, using the processors 1012 and memories 1014, the received data related to the inputs and/or data and render the three-dimensional models, cells, subcells, supplemental cells, interaction areas, user interface elements, item images, item data or details, and/or any other data for presentation via the presentation devices or displays 1016 and/or speakers 1018 to the user in response to the user's request.

In various implementations, the various processors described herein with respect to various components and services of the virtual reality system 1000 may be a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor(s) may commonly, but not necessarily, implement the same ISA.

The various memories, or non-transitory computer readable storage media, described herein with respect to various components and services of the virtual reality system 1000 may be configured to store executable instructions, input data, sensor data, user data, item images, item details, other item data, user interface elements, and/or other data items accessible by the processor(s). In various implementations, the memories may be implemented using any suitable memory technology, such as static random access memory (SRAM), synchronous dynamic RAM (SDRAM), nonvolatile/Flash-type memory, or any other type of memory. In various implementations, program instructions and data implementing desired functions, such as those described above, may be stored within any of the memories of various components and services of the virtual reality system 1000. In other implementations, program instructions and data may be received, sent or stored upon different types of computer-accessible media, such as non-transitory media, or on similar media separate from the memories or non-transitory computer readable storage medium.

Generally speaking, a non-transitory, computer readable storage medium may include storage media or memory media such as magnetic or optical media, e.g., disk or CD/DVD-ROM, coupled to the components and services of the virtual reality system 1000. Program instructions and data stored via a non-transitory computer readable medium may be transmitted by transmission media or signals, such as electrical, electromagnetic, or digital signals, which may be conveyed via a communication medium such as a network and/or a wireless link.

In various implementations, one or more input/output (I/O) interfaces or network interfaces may be configured to coordinate I/O or network traffic between the processor(s), the memories, any of the devices, components, or services of the virtual reality system 1000, and any other devices, components, or services. In some implementations, the I/O or network interfaces may perform any necessary protocol, timing or other data transformations to convert data signals from one component (e.g., memories) into a format suitable for use by another component (e.g., processor(s)). In some implementations, the I/O or network interfaces may include support for devices, components, or services attached through various types of peripheral buses, such as a variant of the Peripheral Component Interconnect (PCI) bus standard or the Universal Serial Bus (USB) standard, for example. In some implementations, the function of the I/O or network interfaces may be split into two or more separate components, such as a north bridge and a south bridge, for example. Also, in some implementations, some or all of the functionality of the I/O or network interfaces, such as interfaces to the memories, may be incorporated directly into the processor(s).

In addition, the network interfaces may enable wired or wireless communication between various components and services of the virtual reality system 1000. In various implementations, the network interfaces may support communication via wired or wireless general data networks, such as a Wi-Fi network, LAN, or WAN. Further, the network interfaces may support communication via other types of networks, including telecommunications networks, cellular communication networks, satellite networks, the Internet, and the like.

The memories of various components and services of the virtual reality system 1000 may include program instructions which may be configured to implement the example processes and/or sub-processes described above. The data storage may include various data stores for maintaining data items such as input data including voice inputs, text inputs, or controller inputs, sensor data from sensors associated with the virtual reality device, the controllers, or the environment, user data including user preferences, user history, user lists, or other user data, item data including images, details, or other item data, user interface elements including three-dimensional models, cells, subcells, supplemental cells, or other user interface elements, and/or other data items that may be provided for generating and interacting with virtual reality user interfaces as described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the virtual reality system 1000 is merely illustrative and is not intended to limit the scope of the present disclosure. In particular, the computing system, devices, and services may include any combination of hardware or software that can perform the indicated functions, including computers, network devices, internet appliances, PDAs, wireless phones, pagers, etc. The virtual reality system 1000 may also be connected to other devices or services that are not illustrated, or instead may operate as a stand-alone system. In addition, the functionality provided by the illustrated components and services may, in some implementations, be combined in fewer components or distributed in additional components or services. Similarly, in some implementations, the functionality of some of the illustrated components or services may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated components or services of the virtual reality system 1000. Some or all of the system components, services, or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the virtual reality system 1000 may be transmitted to the virtual reality system 1000 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other virtual reality system configurations.

Those skilled in the art will appreciate that, in some implementations, the functionality provided by the processes, systems, and services discussed above may be provided in alternative ways, such as being split among more software modules or routines or consolidated into fewer modules or routines. Similarly, in some implementations, illustrated processes, systems, and services may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes, systems, and services as illustrated in the figures and described herein represent example implementations. The processes, systems, and services may be implemented in software, hardware, or a combination thereof in other implementations. Similarly, the order of any process may be changed, and various elements may be added, reordered, combined, omitted, modified, etc., in other implementations.

What is claimed is:

1. A computer-implemented method to operate a virtual reality interface, comprising:
   receiving a search query from a user;
   generating a three-dimensional model that simulates an actual environment based at least in part on the search query;
   generating a plurality of subcells including respective images based at least in part on the search query, the plurality of subcells arranged at a simulated depth from a virtual position of the user of the virtual reality interface, the plurality of subcells arranged with a simulated curvature that extends around the virtual position of the user, and the plurality of subcells positioned within a portion of an available field of view of the user;
   generating an interaction area associated with a base of the virtual position of the user of the virtual reality interface, the interaction area including a border around a periphery of the interaction area, and at least one of the interaction area or the border including a peripheral curvature corresponding to the simulated curvature of the plurality of subcells;
   selecting visual characteristics for at least one of the interaction area or the border based at least in part on the search query; and
   rendering, for presentation within a field of view of the user via a presentation device associated with a virtual reality headset, the three-dimensional model, the plurality of subcells including respective images such that the plurality of subcells overlays at least a portion of the three-dimensional model, and the interaction area including selected visual characteristics such that the interaction area is spaced apart from but proximate the plurality of subcells.

2. The computer-implemented method of claim 1, wherein a shape of the periphery of the interaction area includes at least one of a circle, an ellipse, a rectangle, or a square rendered at the base of the virtual position of the user and substantially centered with respect to the virtual position of the user.

3. The computer-implemented method of claim 1, wherein the interaction area includes first visual characteristics, and the border of the interaction area includes second visual characteristics different from the first visual characteristics.

4. The computer-implemented method of claim 1, wherein the interaction area includes at least one of a home button, a search button, or an account button.

5. A computer-implemented method, comprising:
   generating an interaction area associated with a base of a virtual position of a user of a virtual reality interface, the interaction area including a border around at least a portion of a periphery of the interaction area, and the virtual reality interface further including at least one subcell including a respective image that is arranged at a simulated depth and with a simulated curvature from the virtual position of the user;

selecting visual characteristics for at least one of the interaction area or the border based at least in part on a first input; and causing presentation, via a presentation device associated with a virtual reality device, of the at least one subcell including the respective image and the interaction area including selected visual characteristics.

6. The computer-implemented method of claim 5, further comprising:

receiving the first input from the user; and generating a plurality of subcells including respective images, the plurality of subcells including the at least one subcell, and the plurality of subcells arranged at the simulated depth and with the simulated curvature from the virtual position of the user;

wherein the first input comprises an initiation of an application executing on the virtual reality device;

wherein the selected visual characteristics for the at least one of the interaction area or the border comprise initiation visual characteristics that transition to default visual characteristics;

wherein the initiation visual characteristics include first visual characteristics associated with the interaction area and second visual characteristics associated with the border; and wherein the default visual characteristics include third visual characteristics associated with the interaction area and fourth visual characteristics associated with the border.

7. The computer-implemented method of claim 5, wherein the causing presentation of the interaction area including selected visual characteristics comprises causing presentation of a movement of the interaction area toward or away from the virtual position of the user.

8. The computer-implemented method of claim 5, wherein the causing presentation of the interaction area including selected visual characteristics comprises causing presentation of at least one of movement, animation, or a change in illumination of the interaction area associated with the virtual position of the user.

9. The computer-implemented method of claim 5, further comprising:

receiving a second input from the user;

modifying the selected visual characteristics for the at least one of the interaction area or the border based at least in part on the second input; and causing presentation, via the presentation device associated with the virtual reality device, of the interaction area including modified, selected visual characteristics.

10. The computer-implemented method of claim 9, wherein the second input comprises an indication of a voice input;

wherein the modified, selected visual characteristics for the at least one of the interaction area or the border comprise voice input visual characteristics; and wherein the voice input visual characteristics include fifth visual characteristics associated with the interaction area and sixth visual characteristics associated with the border, the sixth visual characteristics further including a vertical wall that overlays at least a portion of the at least one subcell.

11. The computer-implemented method of claim 9, wherein the second input comprises a user query;

wherein the modified, selected visual characteristics for the at least one of the interaction area or the border comprise searching/loading visual characteristics; and wherein the searching/loading visual characteristics include seventh visual characteristics associated with the interaction area and eighth visual characteristics associated with the border.

12. The computer-implemented method of claim 9, wherein the second input comprises a selection input associated with the at least one subcell;

wherein the modified, selected visual characteristics for the at least one of the interaction area or the border comprise selection visual characteristics; and wherein the selection visual characteristics include ninth visual characteristics associated with the interaction area and tenth visual characteristics associated with the border, the selection visual characteristics further including at least one visual change associated with the at least one subcell.

13. The computer-implemented method of claim 9, wherein the second input comprises a confirmation of a purchase;

wherein the modified, selected visual characteristics for the at least one of the interaction area or the border comprise confirmation visual characteristics; and wherein the confirmation visual characteristics include eleventh visual characteristics associated with the interaction area and twelfth visual characteristics associated with the border.

14. The computer-implemented method of claim 9, wherein the second input comprises a volume change input;

wherein the modified, selected visual characteristics for the at least one of the interaction area or the border comprise volume visual characteristics; and wherein the volume visual characteristics include thirteenth visual characteristics associated with the interaction area and fourteenth visual characteristics associated with the border, the volume visual characteristics further including a range of relative proportions between the thirteenth visual characteristics and the fourteenth visual characteristics corresponding to a range of volume.

15. The computer-implemented method of claim 9, wherein the second input comprises a scroll/zoom limit input associated with the at least one subcell;

wherein the modified, selected visual characteristics for the at least one of the interaction area or the border comprise scroll/zoom limit visual characteristics;

wherein the scroll/zoom limit visual characteristics include fifteenth visual characteristics associated with the interaction area and sixteenth visual characteristics associated with the border, the scroll/zoom limit visual characteristics further including at least one visual change associated with the at least one subcell.

16. The computer-implemented method of claim 9, wherein the second input comprises a cell/subcell expansion input associated with the at least one subcell;

wherein the modified, selected visual characteristics for the at least one of the interaction area or the border comprise expansion visual characteristics; and wherein the expansion visual characteristics include seventeenth visual characteristics associated with the interaction area and eighteenth visual characteristics associated with the border, the expansion visual characteristics further including at least one visual change associated with the at least one subcell.

17. A system to operate a virtual reality interface, comprising:
- a virtual reality device;
- a controller;
- a microphone; and
- at least one processor in communication with a memory, the virtual reality device, the controller, and the microphone, the at least one processor configured to at least:
  - generate an interaction area associated with a base of a virtual position of a user of the virtual reality interface, the interaction area including a border around at least a portion of a periphery of the interaction area, and the virtual reality interface further including at least one subcell including a respective image that is arranged at a simulated depth and with a simulated curvature from the virtual position of the user;
  - select first visual characteristics associated with the interaction area and second visual characteristics associated with the border based at least in part on a first input received from the user via at least one of the virtual reality device, the controller, or the microphone; and
  - cause presentation, via a presentation device associated with the virtual reality device, of the at least one subcell including the respective image, the interaction area including selected first visual characteristics, and the border including selected second visual characteristics.

18. The system of claim 17, wherein the at least one processor is further configured to at least:
- receive a second input from the user;
- modify the selected visual characteristics for at least one of the interaction area or the border based at least in part on the second input; and
- cause presentation, via the presentation device associated with the virtual reality device, of the at least one of the interaction area or the border including modified, selected visual characteristics.

19. The system of claim 18, wherein the modified, selected visual characteristics include third visual characteristics associated with the interaction area and fourth visual characteristics associated with the border.

20. The system of claim 18, wherein the modified, selected visual characteristics include at least one of movement, animation, or a change in illumination of the at least one of the interaction area or the border.

* * * * *